(12) United States Patent
Yergenson

(10) Patent No.: US 6,266,073 B1
(45) Date of Patent: Jul. 24, 2001

(54) FOUR BEAM ELECTROPHOTOGRAPHIC PRINTING APPARATUS

(75) Inventor: Robin P. Yergenson, Eagle, ID (US)

(73) Assignee: Hewlett-Packard Co., Palo Alto, CA (US)

(*) Notice: Subject to any disclaimer, the term of this patent is extended or adjusted under 35 U.S.C. 154(b) by 0 days.

(21) Appl. No.: 09/378,225

(22) Filed: Aug. 19, 1999

(51) Int. Cl.[7] ........................... G03G 15/01; G03G 15/04
(52) U.S. Cl. ...................... 347/115; 399/231; 430/42
(58) Field of Search .................... 347/115, 118, 347/119, 232, 243; 359/203, 204, 216; 430/42, 45; 399/223, 231

(56) References Cited

U.S. PATENT DOCUMENTS

| | | | |
|---|---|---|---|
| 4,416,533 | * 11/1983 | Tokunaga et al. | 347/118 |
| 4,467,334 | * 8/1984 | Anzai | 347/118 |
| 5,500,727 | * 3/1996 | Maruyama et al. | 339/39 |
| 5,716,744 | * 2/1998 | Yergenson | 430/42 |
| 5,799,230 | * 8/1998 | Lloyd | 399/107 |

FOREIGN PATENT DOCUMENTS 63-273880 * 11/1988 (JP).

* cited by examiner

*Primary Examiner*—Joan Pendegrass

(57) ABSTRACT

A method and apparatus for an electrophotographic color printer. The method of developing a color image onto a photoconductor includes providing a single base charge to the photoconductor and then using a cascade of developer potentials for the toners in the process such that earlier applied toners are at higher electrical potentials than are later applied toners. Consequently, the latter applied toners will not tend to migrate to the previously developed sections. Additionally, the method includes applying color toners in the sequential order of black, cyan, magenta (or magenta, cyan), and yellow. In this manner, any contamination of previously applied toner by later applied toner will be less evident. An apparatus for performing this cascading color printing method is also disclosed. The invention further includes an apparatus for performing four-beam laser scanning of a photoconductor using a single rotatable, polygonal-sided mirror and as few as one laser. The rotatable mirror has a plurality of reflective facets corresponding to sides of the polygon. At least one of the reflective facets is oriented at a first angle with respect to a vertical axis of rotation of the rotatable mirror to cause a beam of laser energy from the laser to be reflected to a first position on the photoconductive material. At least a second of the reflective facets is oriented at a second angle with respect to the vertical axis of rotation of the rotatable mirror to cause a beam of laser energy from the laser to be reflected to a second position on the photoconductive material.

11 Claims, 11 Drawing Sheets

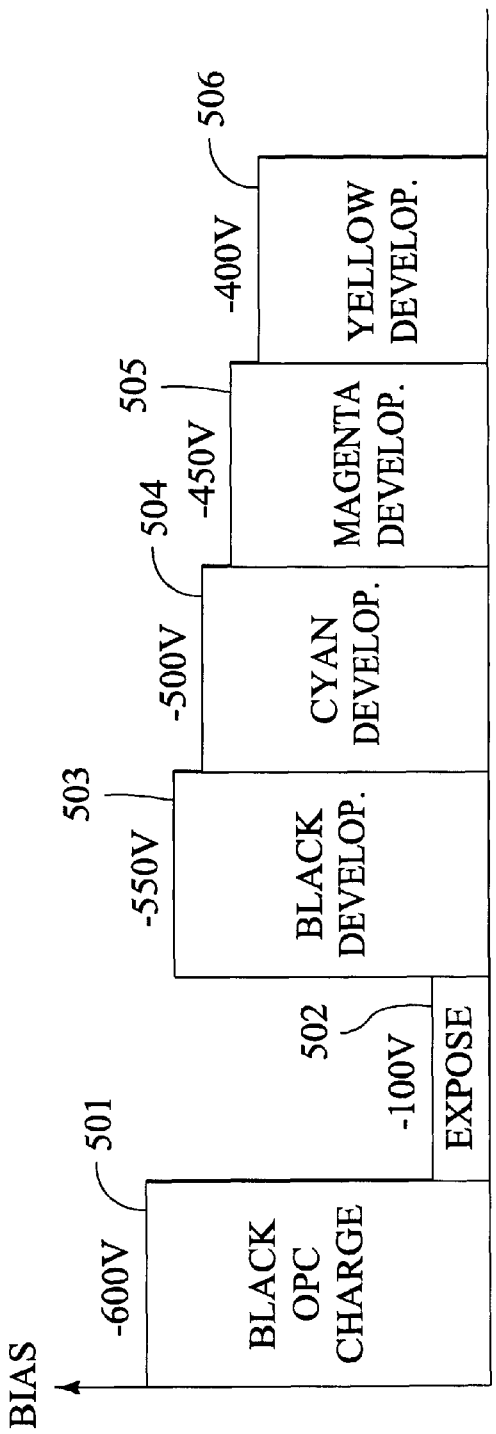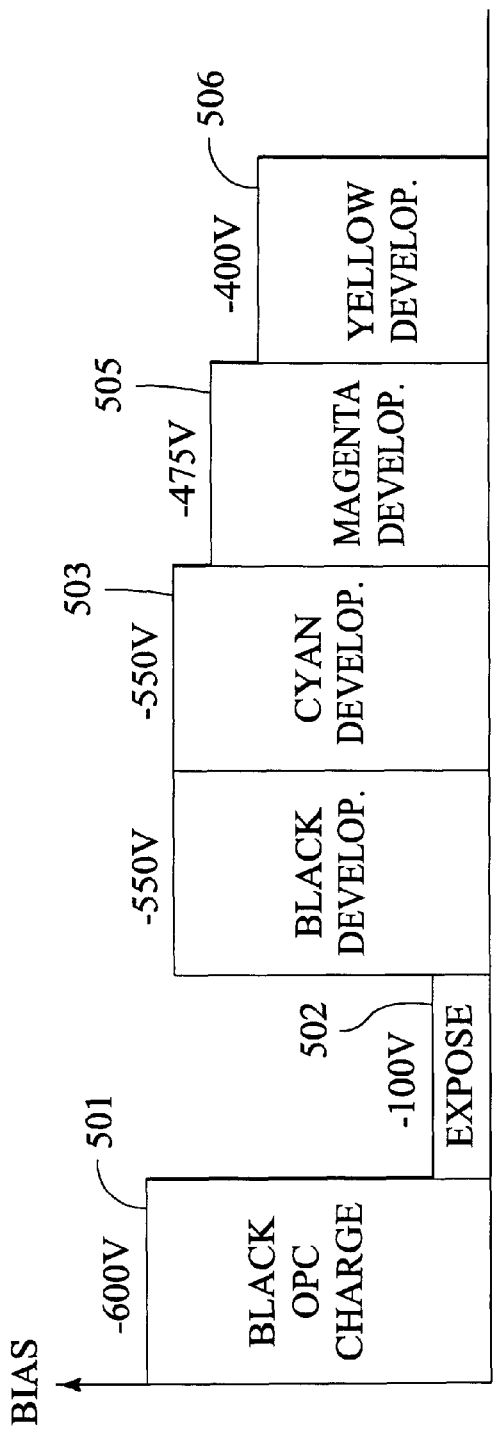

FOUR BEAM ELECTROPHOTOGRAPHIC PRINTING APPARATUS

FIELD OF THE INVENTION

This invention pertains to inline color laser imaging devices, as well as electrophotographic development processes, and in particular to methods and apparatus for achieving four color high quality printing and copying with a system having a simplified design.

BACKGROUND

Color printing by an electrophotographic printer is achieved by scanning a digitized image onto a photoconductor. Typically, the scanning is performed with laser diodes which pulse a beam of laser energy onto the photoconductor. Light emitting diodes (LEDs) can be used in place of the laser diodes. The photoconductor typically comprises a drum or a belt coated with a photoconductive material capable of retaining localized electrical charges. Each localized area capable of receiving a charge corresponds to a pixel. Each pixel is charged to a base electrical charge, and then is either exposed or not exposed by the laser, as dictated by the digital data used to pulse the laser. Exposing a pixel corresponds to electrically altering (typically discharging) the localized area from the base electrical charge to a different electrical charge. One charge will attract toner, and the other charge will not. In this manner, toner is selectively transferred to the photoconductor. In most electrophotographic printing processes, the exposed (electrically discharged) pixels attract toner onto the photoconductor. This process is known as discharge area development (DAD). However, in some electrophotographic printing processes the toner is attracted to the un-discharged (i.e., charged) area on the photoconductor. This latter type of electrophotographic printing is known as charge-area-development (CAD). For purposes of discussion, it will be assumed that DAD is used, although the present invention is not limited to DAD.

Once the photoconductor has had the desired toner transferred to it, the toner is then transferred to the intermediate or finished product medium. This transfer can either be direct or it can be indirect using an intermediate transfer device. The finished product medium typically comprises a sheet of paper, normally white, but can also comprise a transparency or a colored sheet of paper. After the toner is transferred to the finished product medium, it is processed to fix the toner to the medium. This last step is normally accomplished by thermally heating the toner to fuse it to the medium, or applying pressure to the toner on the medium.

There are a variety of known methods for selectively attracting toner to a photoconductor. Generally, each toner has a known electrical potential affinity. Selected areas of the photoconductor are exposed from a base potential to the potential for the selected toner, and then the photoconductor is exposed to the toner so that the toner is attracted to the selectively exposed areas. This latter step is known as developing the photoconductor. In some processes, after the photoconductor is developed by a first toner, the photoconductor is then recharged to the base potential and subsequently exposed and developed by a second toner. In other processes, the photoconductor is not recharged to the base potential after being exposed and developed by a selected toner. In yet another process, the photoconductor is exposed and developed by a plurality of toners, then recharged, and then exposed and developed by another toner. In certain processes, individual photoconductors are individually developed with a dedicated color, and then the toner is transferred from the various photoconductors to a transfer medium which then transfers the toner to the finished product medium. The selection of the charge-expose-develop process depends on a number of variables, such as the type of toner used and the ultimate quality of the image desired. The quality of the final image on the medium is typically associated with complexity and cost of the printer, such that higher quality electrophotographic printers which produce higher quality images are more complex, and concomitantly more expensive.

Image data for an electrophotographic printer (which will also be known herein as a "laser printer"), including color laser printers, is digital data which is stored in computer memory. The data is stored in a matrix or "raster" which identifies the location and color of each pixel which comprises the overall image. The raster image data can be obtained by scanning an original analog document and digitizing the image into raster data, or by reading an already digitized image file. The former method is more common to photocopiers, while the latter method is more common to printing computer files using a printer. Accordingly, the technology to which the invention described below is applicable to either photocopiers or printers. Recent technology has removed this distinction, such that a single printing apparatus can be used either as a copier or as a printer for computer files. These apparatus have been known as multifunction printers ("MFPs")", a term indicating the ability to act as a photocopier, a printer, or a facsimile machine. In any event, the image to be printed onto tangible media is stored as a digital image file. The digital image data is then used to pulse the beam of a laser in the manner described above so that the image can be reproduced by the electrophotographic printing apparatus. Accordingly, the expression "printer" should not be considered as limiting to a device for printing a file from a computer, but should also include a photocopier capable of printing a digitized image of an original document. "Original documents" include not only already digitized documents such as text and image files, but photographs and other images, including hybrid text-image documents, which are scanned and digitized into raster data.

The raster image data file is essentially organized into a two dimensional matrix. The image is digitized into a number of lines. Each line comprises a number of discrete dots or pixels across the line. Each pixel is assigned a binary value relating information pertaining to its color and potentially other attributes, such as density. The combination of lines and pixels makes up the resultant image. The digital image is stored in computer readable memory as a raster image. That is, the image is cataloged by line, and each line is cataloged by each pixel in the line. A computer processor reads the raster image data line by line, and actuates the laser to selectively expose a pixel based on the presence or absence of coloration, and the degree of coloration for the pixel. Typical pixel densities for images are in the range of 300 to 1200 pixels per inch, in each direction.

The method of transferring the digital raster data to the photoconductor via a laser, lasers or LEDs is known as the image scanning process or the scanning process. The scanning process is performed by a scanning portion or scanning section of the electrophotographic printer. The process of attracting toner to the photoconductor is known as the developing process. The developing process is accomplished by the developer section of the printer. Image quality is dependent on both of these processes. Image quality is thus dependent on both the scanning section of the printer, which transfers the raster data image to the photoconductor, as well as the developer section of the printer, which manages the transfer of the toner to the photoconductor.

A typical in-line color laser printer utilizes a plurality (typically 4) laser scanners to generate a latent electrostatic image for each color plane to be printed. This allows for four colors to be imaged on a photoconductor in a single pass of the photoconductor past the laser. Alternately, a single laser can be used and the photoconductor passed by the laser four times. This latter method is known as four-pass color printing. While four-pass color printing allows a single laser diode to be used and thus provides for a simplified design over in-line imaging, it is essentially four times slower than in-line imaging.

The four color planes typically printed, and which are generally considered as necessary to generate a relatively complete palate of colors, are yellow, magenta, cyan and black. That is, the color printer is typically provided with toners in each of these four colors. These colors will be known herein as the "primary colors". Some printers have the capability of printing one base color on top of another on the same pixel, so as to generate a fuller palate of finished colors. However, this normally requires recharging the photoconductor between developing stations and performing a secondary exposure through already deposited toner. The subsequent exposure on top of already deposited toner normally does not acquire the same electrical properties as an exposure of the photoconductor where no toner has been deposited. This results in uneven distribution of toner between secondary developed pixels and originally developed pixels. Alternately, four photoconductors, one for each primary color, can be used in conjunction with an intermediate transfer belt. This configuration is described more fully below with respect to the prior art apparatus shown in FIG. 1. While a multiple photoconductor configuration resolves the problem of developing subsequent toner over already developed toner, it adds a significant degree of complexity to the printing apparatus.

In the scanning process, a laser is scanned from one edge of the photoconductor to the opposing edge and is selectively actuated or not actuated on a pixel-by-pixel basis to scan a line of the image onto the photoconductor. The photoconductor advances and the next line of the image is scanned by the laser onto the photoconductor. In a multiple laser printer, more than one laser can be actuated simultaneously so as to more quickly generate the complete image onto the photoconductor. The side-to-side scanning of each laser is traditionally accomplished using a dedicated multi-sided or faceted rotating mirror. Such a mirror will be known herein as a "polygon" due to the polygonal shape of the mirror. The reflective surface of the mirrors are typically ground and polished aluminum. The laser beam impinges on one facet of the polygonal mirror and is reflected to a secondary or deflector mirror, which directs the laser beam to a unique, relative lineal position on the light sensitive surface of the photoconductor. By "relative", it is understood that the photoconductor moves with respect to the linear position, but the position remains fixed in space. As the polygonal mirror rotates, the angle of incidence, and hence the angle of reflection, of the laser beam will vary. This causes the laser beam to be scanned across the photoconductor at the unique relative lineal position from a first edge to a second edge of the photoconductor. As the mirror rotates to an edge of the polygon between facets, the laser is essentially reset to the first edge of the photoconductor to begin scanning a new line onto the advancing photoconductor. These mirrors tend to rotate at very high speeds, often in excess of 20,000 rpm.

For color printing, it is important to assure the registration of the different colors. That is, each laser should be aligned with respect to the other lasers such that a given pixel in the raster image is associated with a single common point on the photoconductor, regardless of which laser is used to identify the point. A registration which is "off" will result in a blurry image, or an image with colors not representative of the raster image. Registration is thus dependent on aligning all of the lasers in a laser printer. Each laser and its associated components (i.e., rotating mirror, optical elements, and deflector mirror) are typically mounted in a precision housing to keep the components in relative fixed position with respect to one another. The housings are typically molded plastic. Assuring registration of the lasers requires aligning the four housings within the printer itself. As environmental conditions within the printer change (e.g., temperature), this alignment can change.

FIG. 1 depicts a schematic side elevation diagram of a prior art four laser color electrophotographic printer "A". The printer "A" comprises a scanning section "B" and a photoconductor section "C". The photoconductor section shown here comprises a rotating belt 5 which supports a photoconductive material. Four developing stations, 6, 7, 8 and 9, are located proximate to the belt 5 and affix toner to the photoconductor in response to selective exposure of the photoconductive material by the laser beams at points "D", "E", "F" and "G" along the belt. For exemplary purposes only, developing station 6 can be the yellow developer, station 7 can be the magenta developer, station 8 can be the cyan developer, and station 9 can be the black developer. Each developing station has its own photoconductor, base charging unit to apply a base electrical charge to the photoconductor, and cleaning station to remove surplus toner from the photoconductor. Toner applied to each photoconductor is in turn transferred to the transfer belt 5. Prior to each developing station is a base charging unit 23 which applies a base electrical potential or bias to the transfer belt 5. In this way, the transfer belt is charged, a first color is applied to the transfer belt, the belt is recharged, a second color is applied, and so on. Finally, all four colors are transferred from the transfer belt 5 to the finished product medium "I" at transfer station 24. Any residual toner is removed from the transfer belt at belt cleaning station 25.

The scanning section "B" in FIG. 1 comprises four scanning laser stations, 11, 12, 13 and 14. Each scanning station comprises a laser 15, a rotating mirror 16, a motor 17 for driving the mirror 16, a laser beam focusing lens 19, an aligning lens 18, a deflector mirror 21 for deflecting the laser beam onto the photoconductor belt 5, and a housing 22 for holding the aforementioned components.

Since only partial alignment of the laser beams with respect to one another can be achieve by aligning the housings which contain the scanning assemblies, in-line color printers are typically also provided with color plane sensors to sense color plane alignment. Sensors are provided to detect shifts in color planes in both the side-to-side scanning direction (the "scan" direction), as well as in the direction of advance of the photoconductor (i.e., the "process" direction). The sensors can provide a feedback to the scanning system and corrections can be made to reposition the laser beam using various known electrical and mechanical methods.

The space required within a printer unit for a plurality of scanning assembly housings tends to reduce the focal length which can be achieved with each laser (i.e., the distance from the focusing lens to the photoconductor surface). Generally, shorter focal lengths require higher quality optics to focus the beam over the shorter distances. Obtaining greater focal lengths with multiple scanning assemblies would require increasing the size of the printer. Since many printers are chosen for desk-top use, a large printer is undesirable.

Each rotating mirror assembly is driven by its own dedicated motor. The power consumption for each mirror driving motor is typically about 20 watts. Thus, for a four-laser printer, the mirror drives alone consume about 80 watts. This requires a larger power supply, generates a fair amount of heat, and generally adds cost and complexity to the overall printer design.

What is needed then is an electrophotographic color printer which reduces the complexity of the scanning section.

The developing section of electrophotographic color printers is another area where simplification is desirable. The developer sections of most electrophotographic printers require that the photoconductive material be recharged between developers. In a four color printer using one-pass imaging, this requires three additional charging stations, which typically comprise a corona discharge device which is frequently a thin wire held in close proximity to the photoconductor. Over time, these wires need to be replaced. Other designs comprise four separate photoconductor substations which each individually deposit toner of a unique color onto a transfer belt. The transfer belt then redeposits the toner onto the print media. This latter configuration overcomes the difficulty of printing color-on-color, yet results in a complex apparatus for the developer section. Specifically, each photoconductor substation is provided with its own photoconductor, charging device, transfer mechanism to transfer toner to the transfer belt, and cleaning station to remove residual toner from the photoconductor. In addition, the transfer belt is provided with a charging station and a cleaning station. For four-color printing, the number of components in this latter configuration is quite large, and the power requirements become significant as well.

In addition to problems of complexity in the prior art developer sections, producing quality color images is also a challenge. Specifically, there are numerous problems in getting toner to deposit on the photoconductor or transfer belt in a manner which faithfully reproduces the raster data image. Some of those problems will now be discussed.

When a single photoconductor is used to collect the various toners prior to depositing them on the final print media, an exposed area is typically left unsaturated. That is, the toner does not completely electrically saturate the exposed area to bring the electrical field on the area to zero. This leaves a residual electrical field on the photoconductor which can attract toner from the next developer station onto the already deposited toner. Ideally, toner develops to completion (i.e., a sufficient amount of charged toner builds up in the exposed area such that the voltage of the developed area equals the voltage bias of the developer and the electrical field goes to zero); in reality, this typically does not occur. Frequently the exposed field is only developed to fifty or sixty percent of completion. Charging between developments helps to overcome this problem, but requires three additional charging stations, as discussed previously.

The single-photoconductor configuration also allows previously deposited toner to migrate into the toner hoppers of subsequent toners. This is a result of recharging the developer between developer substations. The recharge not only charges the photoconductive material, but the previously deposited toner. When provided with an electrical field, the toner can actually leave the photoconductor and migrate into subsequent toner hoppers, thereby contaminating the toner for subsequent printing.

What is needed then is a developing process and apparatus which allows the raster image to be more accurately printed onto the photoconductor by decreasing contamination of already developed pixels with subsequent toner, and reduces contamination of toner hoppers with already deposited toner.

SUMMARY OF THE INVENTION

The invention includes an electrophotographic color imaging system having a scanning section configured to generate a plurality of selectively pulsed beams of laser energy. The laser beams are selectively pulsed according to raster data of an image to be printed by the imaging device, and are used to selectively discharge portions of an electrically charged photoconductive material. The laser beams discharge the photoconductive material to a first electrical potential. The printer also includes a developer section comprising a continuous rotatable surface such as a drum, and photoconductive material which is supported on the continuous surface. The developer section also includes a base charging station positioned proximate to the photoconductive material and configured to impart a predetermined second electrical potential to the photoconductive material as the photoconductive material is moved past the base charging station by the rotatable surface and prior to the photoconductive material being discharged by the pulsed beams of laser energy. The developer section further includes a first developing station and a second developing station. The first developing station is configured to apply a first toner at a third electrical potential to portions of the photoconductive material discharged by a first beam of laser energy from the scanning section. The second developing station configured to apply a second toner at a fourth electrical potential to portions of the photoconductive material discharged by a second beam of laser energy, and subsequent to the first toner. The ascending order of absolute values of the electrical potentials are the first, the fourth, the third, and the second electrical potential.

The invention further includes an electrophotographic color printer having a scanning section which includes a laser configured to generate pulsed beams of laser energy to be directed to a photoconductor section to selectively expose photoconductive material. The scanning section also has a rotatable, polygonal-sided mirror having reflective facets corresponding to selected sides of the polygon. At least a first one of the reflective facets is oriented at a first angle with respect to a vertical axis of rotation of the rotatable mirror to cause a beam of laser energy from the laser to be reflected to a first lineal position on the photoconductive material. At least a second one of the reflective facets is oriented at a second angle with respect to the vertical axis of rotation of the rotatable to cause a beam of laser energy from the laser to be reflected to a second lineal position on the photoconductive material.

Another aspect of the present invention is a method of developing a color image onto a photoconductor. The method includes providing a single base charge to the photoconductor and then using a cascade of developer potentials for the toners in the developing process such that earlier applied toners are developed at higher electrical potentials than are later applied toners, and consequently the latter applied toners will tend to not migrate to the previously developed sections. Specifically, the method includes the steps of providing a photoconductor having a continuous surface on which is supported a photoconductive material, providing a first toner, and providing a second toner. A first electrical bias is applied to a portion of the photoconductive material to create an electrically charged region of the photoconductive material. First selected positions in the charged region of the photoconductive material are then electrically discharged to a second electrical bias which is sufficient to attract the first toner. The first selected portions are then developed with the first toner at a third electrical bias. Second selected positions in the charged region of the photoconductive material are then electrically discharged to a fourth electrical bias which is sufficient to attract the second toner. The second selected portions are then developed with the second toner at a fifth electrical bias. The fifth electrical bias is closer to the fourth electrical bias than is the third electrical bias.

In one embodiment, an electrophotographic printer includes both the scanning section described above paragraph, as well as the developing section described above. In this manner a four-color electrophotographic laser printer can be constructed which includes a single laser, a single rotatable mirror, a single photoconductor drum, and a single base charging station, which does not require intermediate recharging of the photoconductor, and which does not result in unacceptable page contamination of toners applied earlier in the development process by toners applied later in the process.

BRIEF DESCRIPTION OF THE DRAWINGS

FIG. 8A is an electrical charge diagram showing a first embodiment for cascading the electrical biases of the various developing stations to allow single charging four color electrophotographic imaging.

FIG. 8B is an electrical charge diagram showing a second embodiment for cascading the electrical biases of the various developing stations to allow single charging four color electrophotographic imaging.

DETAILED DESCRIPTION OF PREFERRED EMBODIMENTS OF THE INVENTION

While the present invention has particular application to electrophotographic color laser printers, it is understood that the invention has equal applicability in any electrophotographic imaging apparatus which is designed to reproduce digital raster data, including digital photocopiers and facsimile machines. Therefore, when I use the expression "printer", I mean to include any apparatus which is configured to print a color image from digital raster data using lasers and photoconductive material. Further, when I mention applying a color to a photoconductor using a toner, I mean to include applying black as a color.

The Apparatus

Figure 1:
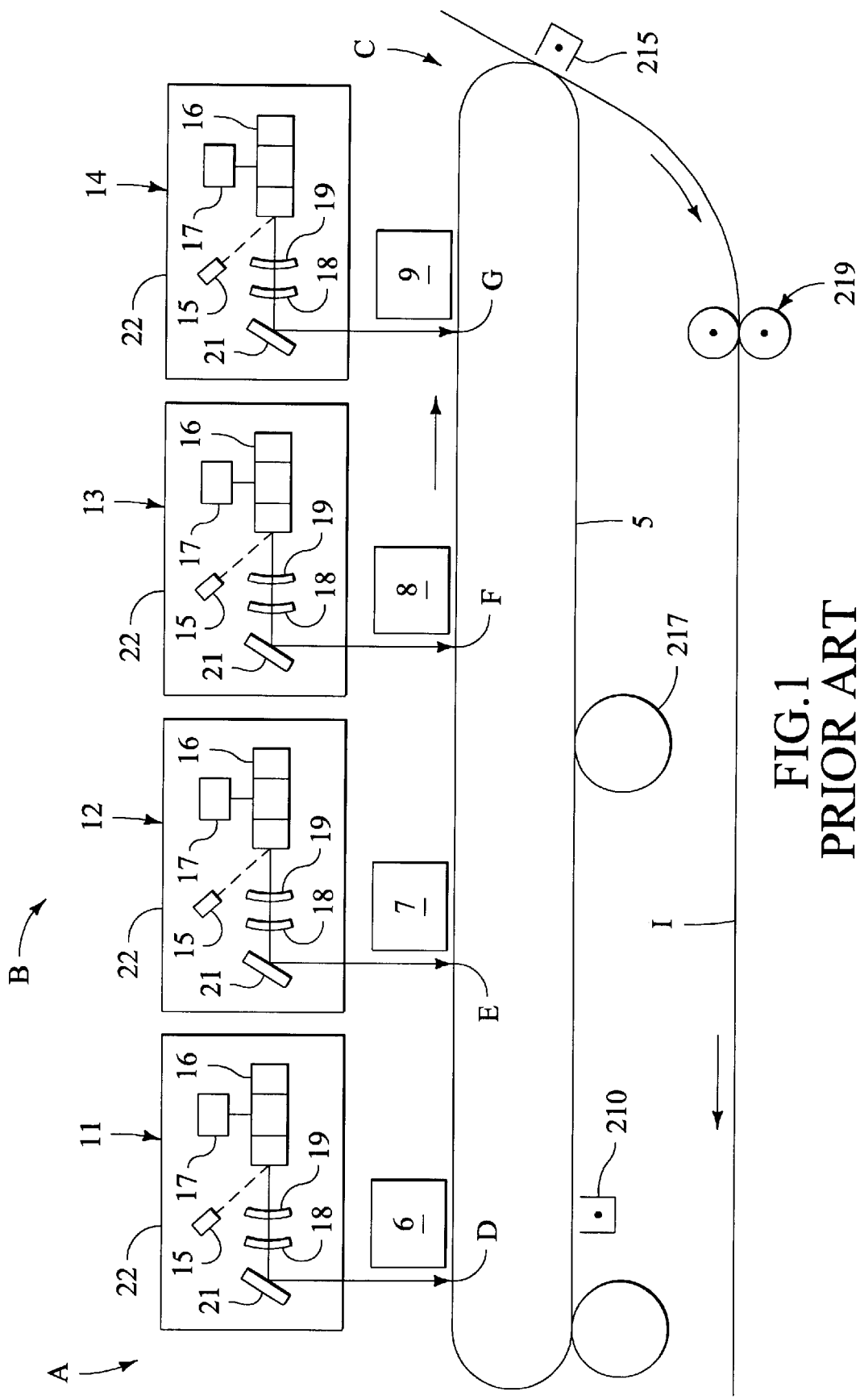
FIG. 1 is a side elevation schematic of a prior art electrophotographic color laser printer.
Figure 2:
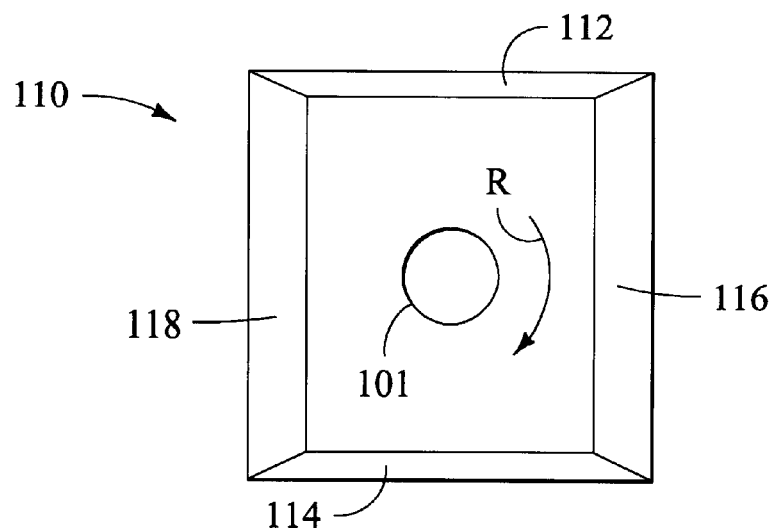
FIG. 2 is a plan view schematic diagram depicting a rotatable, polygonal-sided mirror which can be used in the present invention.
Figure 4A:
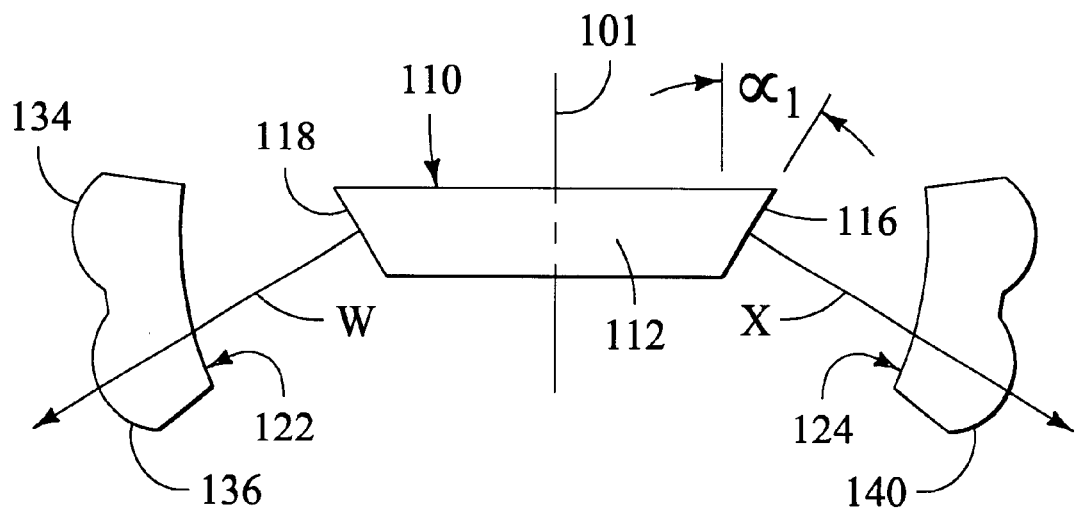
FIG. 4A is a side elevation schematic diagram of a portion of the schematic diagram of FIG. 3 showing a rotatable mirror in a first position.
Figure 4B:
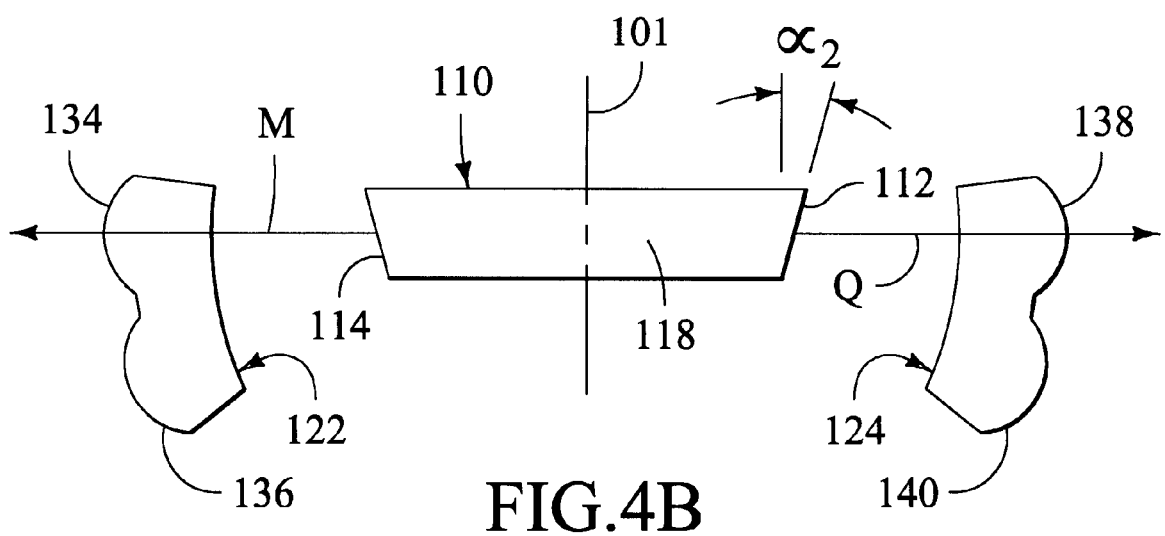
FIG. 4B is a side elevation schematic diagram of a portion of the schematic diagram of FIG. 3 showing the rotatable mirror of FIG. 4A in a second position.

Turning to FIG. 2, a plan view schematic diagram depicting a rotatable, polygonal-sided mirror 110 which can be used in a printer in accordance with the present invention is shown. The mirror 110 is configured to rotate about the axis 101 in the direction R. The mirror 110 comprises a plurality of sides, 112, 116, 114 and 118. Each side preferably constitutes a reflective facet for reflecting a laser beam onto a photoconductor. Turning briefly to FIGS. 4A and 4B, side elevation schematic diagrams of the mirror 110 of FIG. 2 are shown. It is seen from FIGS. 2, 4A and 4B that the mirror 110 constitutes a truncated four-sided pyramid with two sides set at a first angle to the central axis 101, and the other two sides set at a second angle to the central axis 101. As shown in FIG. 2, reflective facets 112 and 114 are set at a first angle, and reflective facets 116 and 118 are set at a second angle with respect to the central axis 101. The reflective surfaces can be ground and polished aluminum. Mirror 110 will be described further below.

Figure 3:
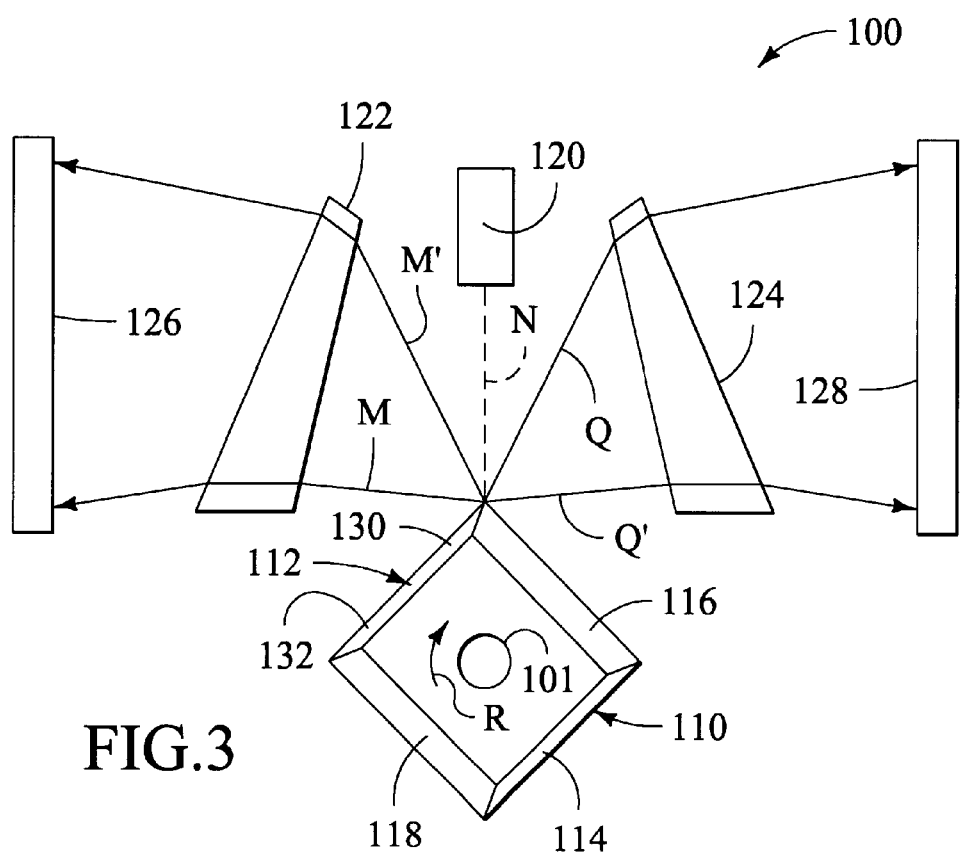
FIG. 3 is a plan view schematic diagram showing in plan view the orientation of the rotatable mirror of FIG. 2 with respect to other components of a scanning section in accordance with the present invention.
Figure 5:
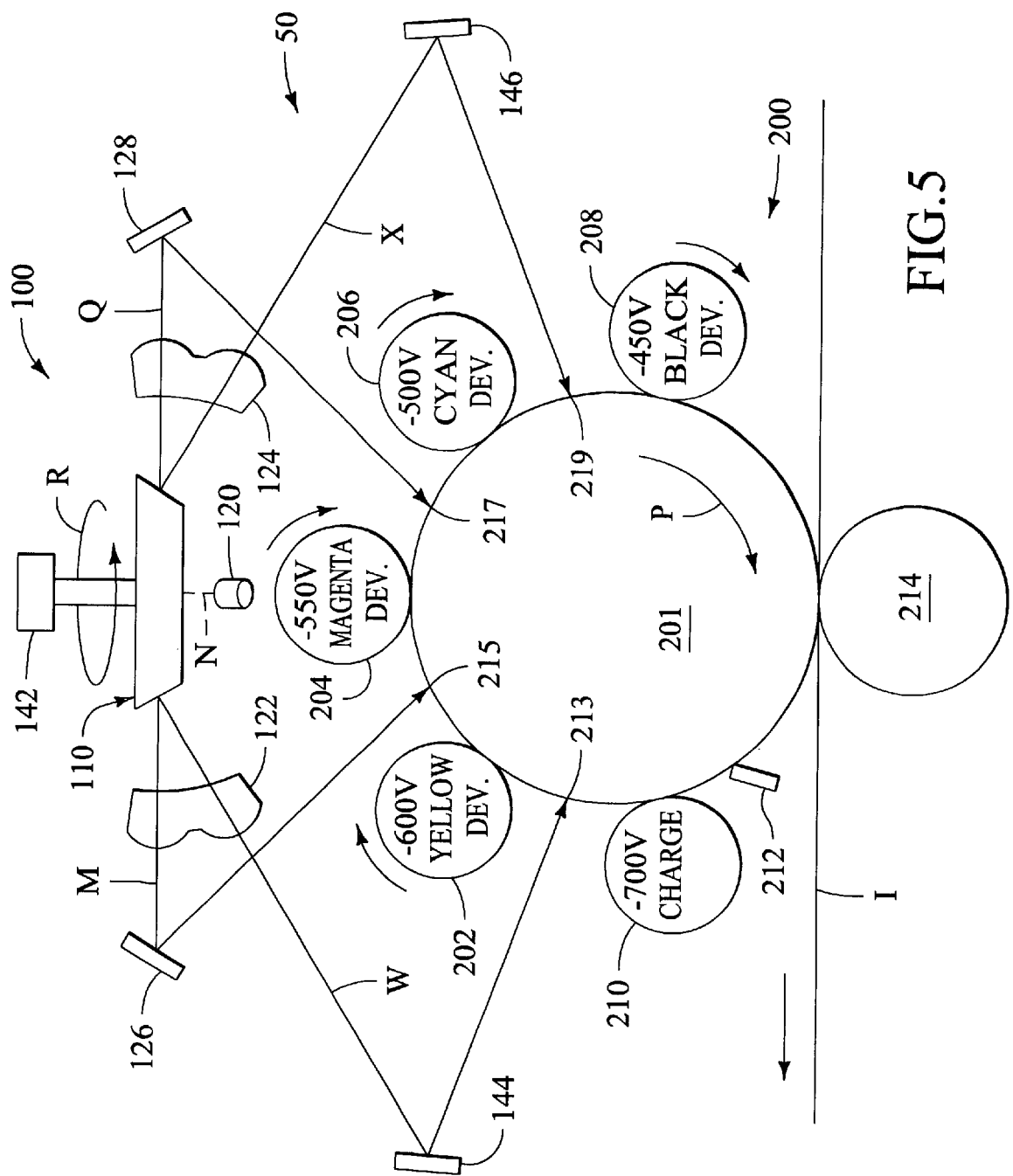
FIG. 5 is a side elevation schematic diagram of one embodiment of the present invention using a photoconductor drum and individual developing stations in the photoconductor section of an electrophotographic printer.

Turning now to FIG. 3, a schematic plan view of a scanner section 100 using the mirror 110 just described is shown. FIG. 3 is a bottom view of the scanner section 100 shown in FIG. 5. FIG. 5 should be viewed in conjunction with FIG. 3 in order to assist understanding of FIG. 3, and in particular the fact that the components shown in FIG. 3 do not all lie in the same plane.

The scanner section 100 of FIG. 3 comprises an exposure assembly 120 which as shown includes a laser diode for generating a pulsed beam of laser energy, as well as complementary optical components (not shown) for correcting astigmatism and other optical irregularities in the laser beam. The exposure assembly can comprise a single laser diode, or multiple laser diodes on a single microchip. The use of multiple laser diodes on a single chip allows two or more lines to be simultaneously scanned onto the photoconductor by a single exposure assembly. However, multiple diodes on the same chip generally are configured to scan at the same developing station, rather that at two different developing stations, and thus do not increase the number of colors that can be developed on the photoconductor, but only increase the speed of printing. In addition to laser diodes, the exposure assembly 120 can comprise an array of light emitting diodes (LEDs). Although not limited to any of the types of exposure devices available, for the sake of simplicity in the following discussion the exposure assembly 120 will be referred to hereinafter as "the laser". The scanner section further comprises a set of optical focusing elements 122 and 124, as well as deflector mirrors 126 and 128.

Optical focusing elements 122 and 124 are positioned and configured to focus beams of laser energy generated by the laser 120 onto photoconductive material (not shown in FIG. 3). Optical focusing elements 122 and 124 are positioned between the rotating mirror 110 and the deflector mirrors 126 and 128, respectively, to intercept the beams of laser energy reflected by the reflective facets of the rotating mirror. The optical focusing elements focus the projected laser beams to a point to remove the ellipsoidal shape the projected beams would tend to take as a result of being scanned across the deflector mirror at an angle in the absence of the optical focusing elements. The optical focusing elements also tend to remove an inherent elliptical shape the projected beams take on even in the absence of being projected at an angle other than normal (perpendicular) to the deflector mirror. The scanning section shown in FIGS. 3 and 4 includes a first focusing lens 122 to focus beams "M" and "W", and a second focusing lens 124 to focus beams "Q" and "X". Focusing lenses 122 and 124 are shown as compound lenses. Each compound lens comprises two lens elements joined together in a single casting or molding. However, each focusing element 122 and 124 can also comprise two individual lenses. The use of compound lenses is preferable since individual lenses each need to be aligned with respect to the laser, as well as with respect to one another. However, the selection of the focusing lenses is ultimately a function of the geometry of the lasers, the polygonal sided rotating mirror, and the photoconductor; four different lenses may be required in certain configurations.

Turning to FIG. 5, it is seen that the scanner section 100 of FIG. 3 includes deflector mirrors 144 and 146, in addition to the deflector mirrors 126 and 128 of FIG. 3. Deflector mirrors 126, 128, 144 and 146 deflect the pulsed beam of laser energy onto photoconductive material (not shown) which is supported on the outer surface of photoconductor drum 201. The photoconductor drum acts as a continuous, rotatable surface for supporting and moving photoconductive material past the scanning laser beams and the developing stations, as will be described further herein.

Turning now to FIG. 4A, a side elevation view of the rotatable polygonal-sided mirror 110 of FIG. 2 is shown. It is seen that reflective facet sides 116 and 118 are mounted at a first angle $\alpha_1$, to the central axis of rotation 101. This will cause the beam of laser energy from the laser (not shown) to be reflected from facets 116 and 118 at a first angle of reflection, as indicated by reflected beams "W" and "X". This causes beam "W" to pass through lower element 136 of the compound focusing lens element 122, and beam "W" to pass through lower element 140 of the compound focusing lens element 124. Turning now to FIG. 4B, the rotatable mirror shown in FIG. 4A has been rotated about rotational axis 101 ninety degrees to the right. In this view, reflective facets 112 and 114 are seen from the side. Reflective facets 112 and 114 are mounted at a second angle $\alpha_2$ with respect to the axis of rotation 101. By comparing FIG. 4A to FIG. 4B, it is seen that angle $\alpha_2$ is less than angle $\alpha_1$. Consequently, the beam of laser energy from the laser (not shown) will be reflected from facets 112 and 114 at a second angle of reflection, different than the angle of reflection for facets 116 and 118, as indicated by reflected beams "M" and "Q". This causes beam "M" to pass through the upper element 134 of the compound focusing lens element 122, and beam "Q" to pass through the upper element 138 of the compound focusing lens element 124. In this manner, depending on which reflective facet is reflecting the beam of laser energy from the laser, the beam will either be reflected to an upper set of deflector mirrors, 126 and 128 of FIG. 5, or a lower set of deflector mirrors, 144 and 146. This allows four beams to be focused onto the photoconductive material, as shown.

Figure 12:
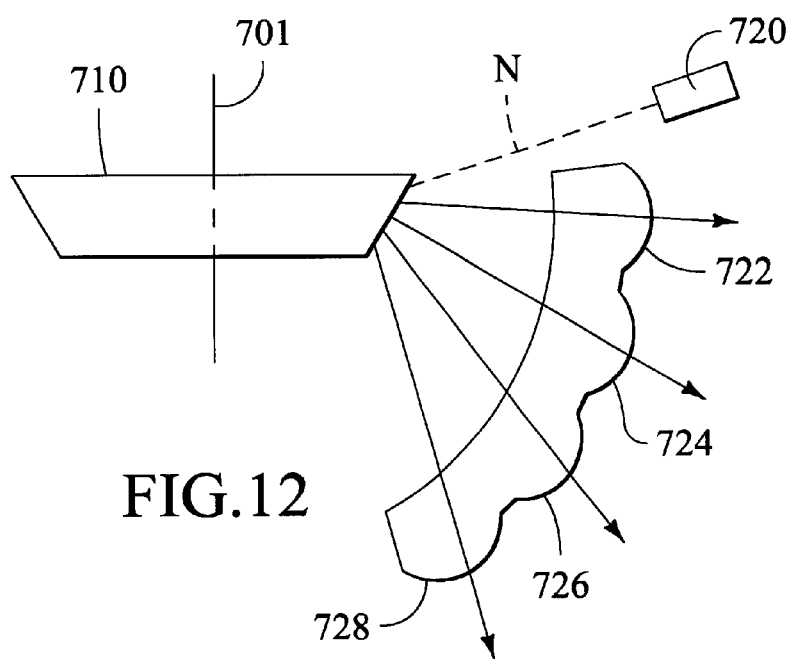
FIG. 12 is a side elevation schematic diagram of a rotatable mirror having four reflective facets set at different relative angles to a central axis.

More generally, it is to be appreciated that providing reflective facets of a rotating mirror at different angles to one another allows for as many different beams to be generated as there are different reflective angles. For example, rather than providing four sides at two different angles, the rotating mirror can have four sides, all at different angles to one another. In this manner, a single laser can be used to generate four separate reflected beams. Such a configuration is shown in FIG. 12 wherein a rotatable mirror 710 has four reflective surfaces all mounted at different angles with respect to the axis of rotation 701 of the mirror 710. The laser 720 generates a beam "N" which is then reflected to one of optical focusing elements 722, 724, 726 or 728, depending on which reflective facet of the rotating mirror 710 the beam "N" strikes. Further, the invention is not limited to the two embodiments just discussed, but encompasses rotatable polygonal-sided scanning mirrors having three or more reflective facets set at two or more different relative angles with respect to a central axis of rotation of the rotatable mirror.

It should also be appreciated that the reflective facets of the rotating mirror do not all need to be of the same length. More specifically, the length of a reflective facet can be selected to accommodate a difference in optical path length between the mirror surface and two different exposure stations on the photoconductor(s). For two reflective facets, one having a shorter length than the other, the shorter facet will cause a laser beam to be scanned through a smaller angle than will the longer facet. In order to achieve the same scan width for both beams, the beam scanned through the smaller angle will need a longer optical path length than will the other beam. In this manner, differences in optical path length between different beams can be accommodated by adjusting the length of the reflective facets of the rotating mirror, rather than by using mirrors and/or other optical elements.

Figure 10:
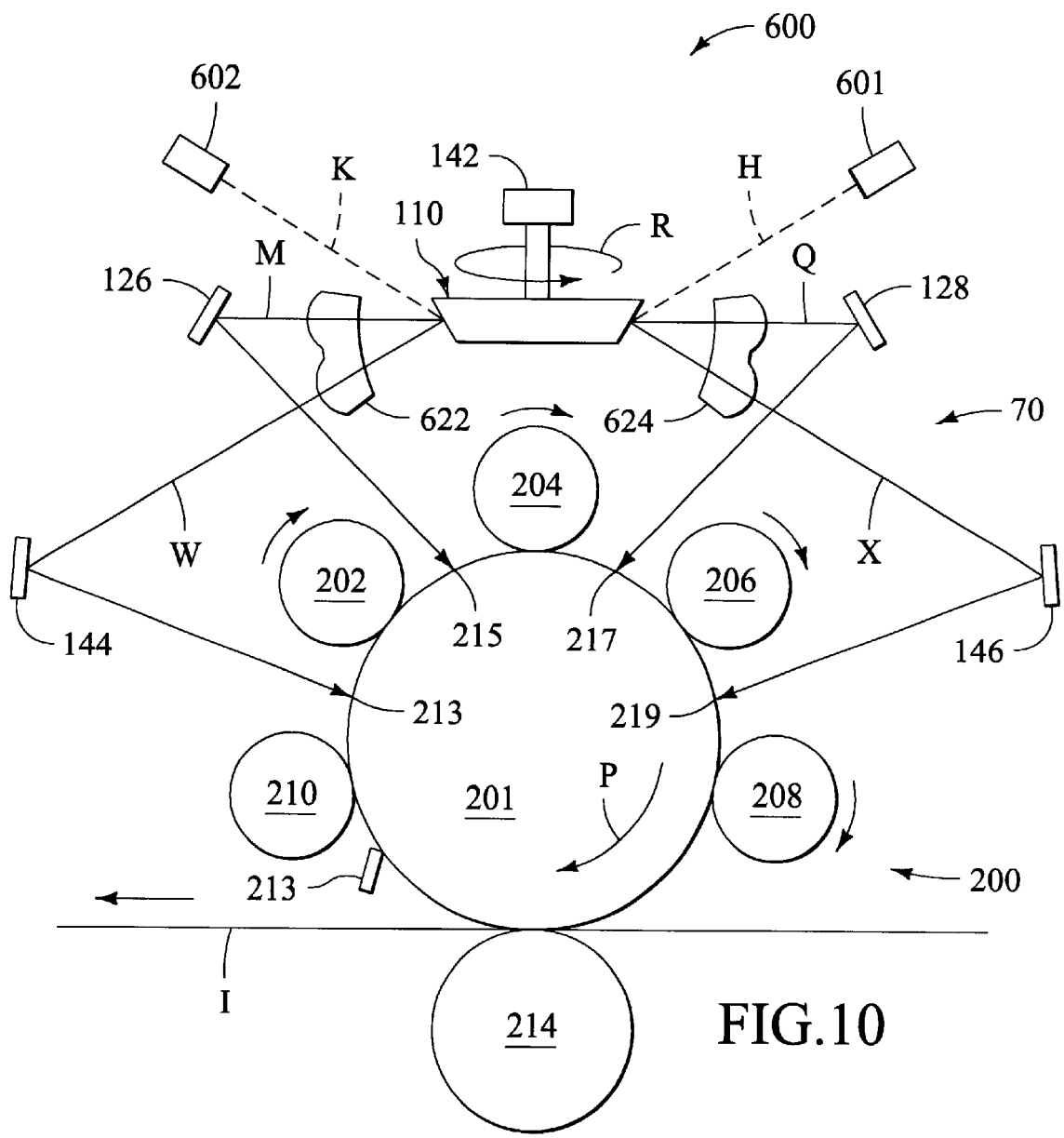
FIG. 10 is a side elevation schematic diagram of an electrophotographic printer with a variation of the scanner section shown in FIGS. 5 and 7.
Figure 11:
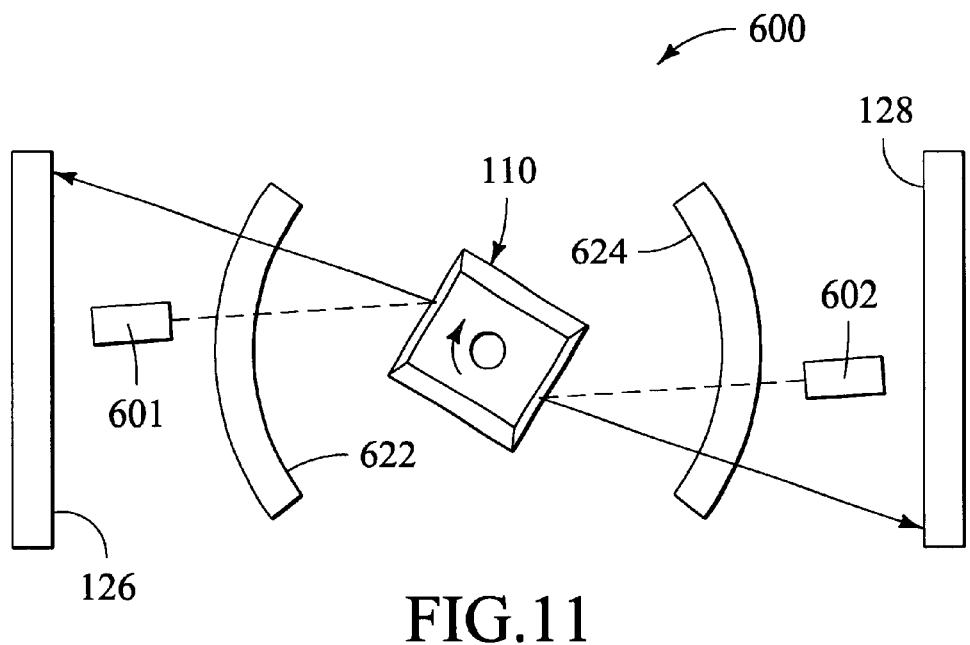
FIG. 11 is a partial plan view of the scanner section of the printer shown in FIG. 10.

Turning to FIG. 10, a variation on the scanner section 100 of FIG. 5 is shown. FIG. 10 depicts scanner section 600 in an electrophotographic printer 70. In the embodiment shown in FIG. 10, the scanner section 600 comprises two laser diode assemblies ("lasers") 601 and 602. Lasers 601 and 602 are configured in a diametrically opposed arrangement and are aimed at opposite sides of the rotatable mirror 110. A bottom view of the scanner section 600 of FIG. 10 is shown in FIG. 11. FIGS. 10 and 11 should be viewed in concert to aid in understanding the relative, spatial positions of lasers 601 and 602, optical focusing elements 622 and 624, deflector mirrors 126 and 128, and rotatable mirror 110. Returning to FIG. 10, as beam "H" from laser 601 strikes either facet 112 or 114 as the mirror 110 rotates about axis 101, the beam "H" will be reflected as beam "Q" and will be directed to lineal position 217 on the photoconductor drum 201. Likewise, as beam "K" from laser 602 strikes either facet 112 or 114 as the mirror 110 rotates about axis 101, the beam "K" will be reflected as beam "M" and will be directed to lineal position 215 on the photoconductor drum 201. However, when beam "H" from laser 601 strikes either facet 116 or 118 as the mirror 110 rotates about axis 101, the beam "H" will be reflected as beam "X" and will be directed to lineal position 219 on the photoconductor drum 201. Likewise, as beam "K" from laser 602 strikes either facet 116 or 118 as the mirror 110 rotates about axis 101, the beam "K" will be reflected as beam "W" and will be directed to lineal position 213 on the photoconductor drum 201.

Figure 9A:
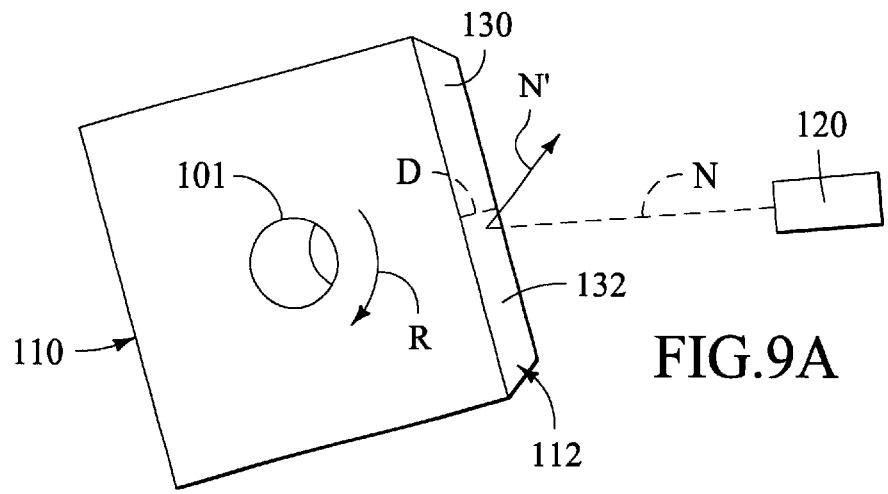
FIG. 9A is an isometric diagram showing a laser beam impinging on a reflective facet of a rotatable mirror in a first position.
Figure 9B:
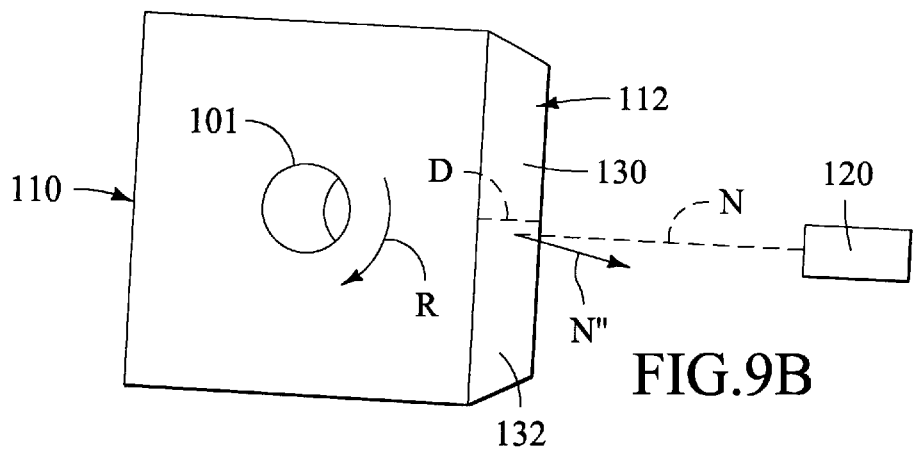
FIG. 9B is an isometric diagram showing a laser beam impinging on a reflective facet of the rotatable mirror of FIG. 9A in a second position.
Figure 9C:
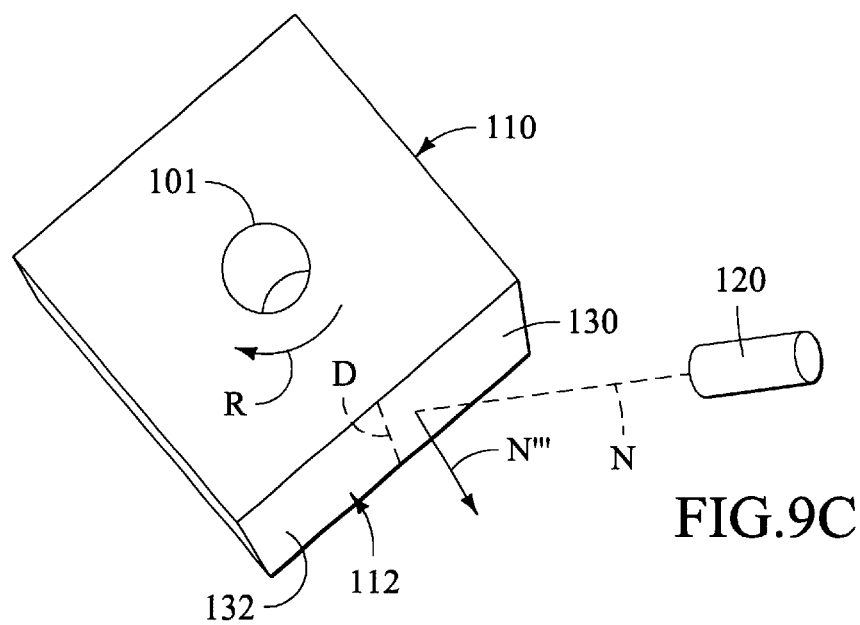
FIG. 9C is an isometric diagram showing a laser beam impinging on a reflective facet of the rotatable mirror of FIG. 9A in a third position.

For any given reflective facet of the rotatable mirror, the incident angle of the laser beam on the facet will change as the rotatable mirror rotates about axis 101. This concept is demonstrated in FIGS. 9A through 9C. In FIG. 9A, the laser 120 is projected onto first half 132 of surface 112. Beam "N" from laser 120 is reflected from reflective facet 112 as beam "N'". Turning now to FIG. 9B, the mirror 110 of FIG. 9A has rotated in a clockwise direction so that the laser beam "N" from the laser 120 is now striking the mid-point "D" of facet 112, and is reflected back in the general direction of the laser as beam "N''". By locating the laser 120 in a plane out of the plane of the reflected beam "N''", the laser does not interfere with the path of the reflected beam. Finally, turning to FIG. 9C, the mirror has rotated clockwise so that beam "N" from laser 120 is striking the second half 130 of reflective facet 112. The beam "N" is now reflected as beam "N'''". By viewing FIGS. 9A through 9C consecutively, it is seen that the reflected beam is swept through an angle as the rotatable mirror 110 rotates about axis 101. In this manner, the beam is caused to be scanned across a given lineal position on the photoconductive material. By "lineal" I do not mean to constrain the position to a straight line, but to any non-intersecting, essentially continuous line, including arcuate lines.

The scanner configuration 600 shown in FIG. 10 allows two lasers to be scanned onto the photoconductive material at the same time. In an alternate embodiment, shown in FIG. 5, a single laser is used in the scanner section 100 of printer 50. As shown in FIG. 5, the scanning section 100 comprises the rotatable mirror 110, the optical focusing elements 122 and 124, and the deflector mirrors 126, 128, 144 and 146. The scanner also has a single laser 120. The laser is positioned essentially between the optical focusing elements 122 and 124 and such that the initial beam of laser energy from the laser 120 is projected essentially parallel to lineal scanning positions 213, 215, 217 and 219 on the photoconductor drum 201. This should be contrasted with the configuration shown in FIG. 11 wherein the lasers 601 and 602 are positioned such that a beam from either laser is essentially perpendicular to the lineal scanning positions 213, 215, 217 and 219. The rotatable mirror 110 of the scanner section 100 of FIG. 5 is positioned to one side of the optical focusing elements 122 and 124, as opposed to the configuration shown in FIG. 11 wherein the rotating mirror is between the optical focusing elements 622 and 624.

As a consequence of the configuration shown in FIG. 5, when the laser beam N from the laser 120 strikes the first half 130 of facet 112 of the rotating mirror 110, it will be swept along a trajectory from "M" to "M'" towards deflector mirror 126 as the rotating mirror rotates, as shown in FIG. 3. As the beam "N" approaches and crosses over the midpoint of reflective facet 112 as the facet is rotated about the axis 101, the beam reflected from the facet 112 passes beyond optical focusing element 122, and is swept past the laser 120 until it strikes the optical focusing element 124. At this point, the beam "N" is striking the second half 132 of the reflective facet 112. As the mirror continues to rotate, the reflected beam is swept along a trajectory from "Q" to "Q'" towards deflector mirror 128. In this manner, two scans at different places on the photoconductive material can be achieved with a single facet of the rotating mirror.

The concept of achieving two scans with a single reflective surface can be coupled with the concept described above of providing a rotatable polygonal-sided scanning mirror having two or more reflective facets set at two or more different relative angles with respect to a central axis of rotation. It should now therefore be appreciated that the number of scans which can be achieved with a rotating mirror and laser configuration is a function of (1) the number of lasers, (2) the number of different relative angles at which the reflective facets are set, and (3) whether the laser or lasers and rotatable mirror are positioned to achieve two scans using a single reflective surface. That is, if we assign each of these variables the respective symbol L, F and D, and S is the number of scans achieved with a given configuration, then we see that S=(L) times (F) times (D)

where D is one or two, depending on the configuration of the laser(s) and the rotatable mirror. For example, a configuration of one laser L and a rotatable mirror having facets F set at two different angles, wherein two scans can be achieved with a single facet, then the number of scans S which can be achieved is 1×2×2=4.

Typically, the number of reflective facets is an even number. The number of reflective facets selected is normally determined by the desired printing speed of the imaging apparatus. For two otherwise identical printers, a polygon having eight reflective facets can achieve twice as many scans as a polygon having four reflective facets, allowing an image to be scanned twice as fast. However, to keep the size of the rotatable mirror small, as the number of facets increases, the length of the facet decreases. Shorter facet lengths result in longer optical path lengths, as described above. Ultimately, the selection of the number of reflective facets to use is a function of the desired printer speed, other system limitations on the maximum possible printer speed, space and/or equipment considerations required to accommodate longer optical path lengths, and limitations in the electronics controlling the imaging process. As described above, varying the length of a reflective facet is one method for accommodating the various optical path lengths.

An advantage of a scanner section of the present invention over the prior art is that the laser or lasers and the other components of the scanning section can be mounted in a single housing in fixed, relative position to one another. The use of a single housing for the scanning section components allows the focal lengths of the laser beams to be increased over the prior art. The advantage of allowing for greater focal lengths is that the optical elements associated with the scanning section, such as the optical focusing elements, can be designed to make smaller corrections to the laser beams to achieve the same overall corrective result. That is, a smaller correction over a longer focal length can achieve the same final corrective result as a large correction over a short focal length. As the correction which needs to be made by a lens increases, the complexity and quality of the lens must also increase.

A further advantage of containing the scanner section components in a single housing is reduction of alignment problems. The use of multiple scanning sections, as in the prior art, necessitated alignment of each scanning section with one another to provide proper registration of the various printed colors. A scanning section having a single housing only needs to be aligned with respect to the developing section. Preferably, the housing for the scanner section components comprises a precision casting. Common materials for such castings comprise aluminum and glass filled polycarbonate.

The embodiment of the invention which will be discussed from this point forward embodies a single laser and a rotatable mirror having four reflective facets set at two different relative angles with respect to one another, wherein the laser and the rotatable mirror are positioned such that two scans of the laser are achieved using a single reflective facet of the rotatable mirror. This is the configuration shown in the scanning section 100 of FIG. 5. However, it is understood that alternate embodiments of the scanning section in accordance with the above disclosure can also be employed.

Returning now to FIG. 5, a printer 50 comprising a scanning section 100 and a developing section 200 is shown. The scanning section 100 is in accordance with the previous paragraph. The scanning section directs and focuses beams of energy from the laser 110 onto photoconductive material (not shown) which is supported on the outer surface of the photoconductor drum 201 in the developing section 200. The beams of laser energy "W", "M", "Q" and "X" are directed to discrete, predetermined, relative linear positions 213, 215, 217 and 219 (respectively) on the photoconductor drum 201 to ensure accurate registration of the resulting image. By "relative positions", I mean that although the photoconductor drum 201 can move with respect to the deflected beam, each beam is preferably directed to a preselected lineal position corresponding to a scan line across which the photoconductive material is moved.

Preferably, the focal paths of each of the laser beams are the same length. The focal path is the distance from the emergent point on the focusing lenses (134, 136, 138 and 140 of FIG. 4A) to the point of impact on the photoconductive material (points 215, 213, 217 and 219, respectively). For example, the distance laser beam "M" travels from emergent point of lens 134 to the point 215 on the photoconductor drum 201 should preferably be the same as the distance laser beam "W" travels from focusing lens emergent point of lens 136 to point 213 on the drum 201. Likewise, the corresponding distances for laser beams "Q" and "X" should be equal to one another and to the focal lengths of beams "M" and "W". In order to obtain this desirable characteristic of essentially equivalent focal lengths, beam "M" can be angled up until its focal length matches that of beam "W". Alternately, secondary deflector mirrors can be provided to generate longer path lengths for beams which would otherwise have shorter focal lengths. Yet another alternative to accommodate differing focal lengths is to modulate the frequency of the pulses of laser energy generated by the laser to selectively change the pulse frequency of the laser according to which beam is being generated. Beams with longer path lengths would be set to a higher frequency than beams with a shorter path length. Such can be accomplished using a frequency modulation circuit to control the frequency of pulsing of the laser. One example of a frequency modulation circuit is a circuit which provides two different clock speeds for the laser pulses. In conjunction with modulated laser frequencies, the facets which reflect the beams having shorter path lengths are preferably of longer side length to compensate for slower the modulated beam pulse frequencies. Preferably, when the beam pulse frequency is modulated, the power of the laser beam is also modulated to provide equal exposure of the photoconductor, regardless of which beam pulse frequency is being used. That is, for a slower pulse frequency, a lower beam power is desirable.

The developer section 200 of the printer 50 shown in FIG. 5 is configured to achieve single charge, four-color printing. By "single charge" I mean that the photoconductive material is only charged to its base potential or bias a single time, and is then exposed and developed without the need for subsequent recharging of the photoconductive material. Further, the expression "charged to its base potential or bias" is intended to include negative as well as positive charges, although for the most part the charge or bias will be a negative bias. Also, by "four-color printing" I mean black and three additional colors (typically yellow, magenta and cyan), as well as the background color of the media on which the image is ultimately printed (frequently a white sheet of paper). Therefore, five "colors" (including black and white) can actually be presented on a printed image using what I will call a "four color printer".

The developer section 200 comprises an initial charging drum 210 which charges the photoconductive material on the photoconductor drum 201 to a base electrical potential. For example, a charge of −700V can be applied to the photoconductive material. Developer stations 202, 204, 206 and 208 can correspond respectively to developer stations configured to deposit toner of yellow, magenta, cyan and black on the photoconductive material. The electrical biases of the toners are preferably selected in descending order, such that the yellow toner has a bias of −600V, the magenta toner has a bias of −550V, the cyan toner has a bias of −500V, and the black toner has a bias of −450V. Prior to each developer station there is an exposure location 213, 215, 217 or 219 for the respective developer stations 202, 204, 206 and 208. The laser from the scanning section 100 selectively exposes the photoconductive material to a bias of −100V at each of the exposure locations. Toner from the developer stations is attracted to the exposed, undeveloped photoconductive material on the photoconductor drum 201 as the drum moves the photoconductive material past the various developer stations. Toner deposited on the photoconductor drum 201 by a previous developer station brings the bias of the developed region to a larger negative bias level so as to prevent toner from a subsequent developer station from being attracted to the previously exposed sections on the photoconductive material. By staging or stair-stepping the biases of the developer stations in the decreasing manner indicated, there is less potential for a subsequent developer station to deposit toner on a previously developed portion of the photoconductive material.

This method of developing can be described as cascade color development, due to the cascading of the biases of the developers to increasingly lower levels. Although the developer section just discussed has been discussed with respect to specific values assigned to the various biases, it is understood that the biases provided herein are exemplary only, and that it is the difference between biases which is more important to the cascade color printing process than the actual values of the biases themselves. Furthermore, it is not necessary that there be a difference in bias levels between all colors. For example, if black toner is developed first, followed by cyan, these two toners can be developed at the same bias level since black is less sensitive to contamination development.

Figure 6A:
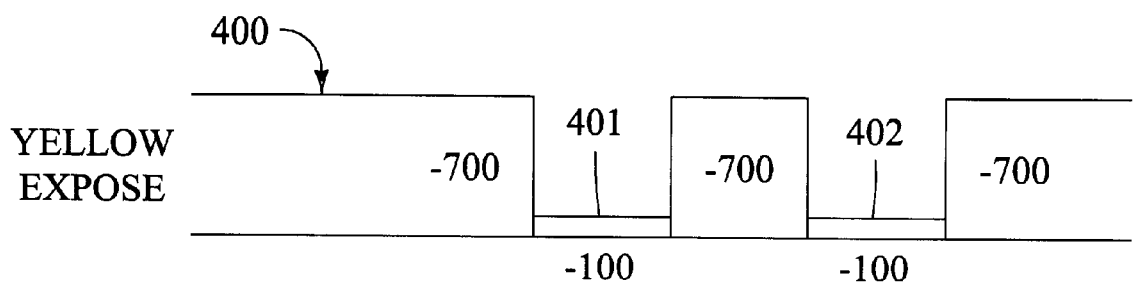
FIG. 6A is diagram showing the electrical bias of a photoconductor following exposure of selected pixels.
Figure 6B:
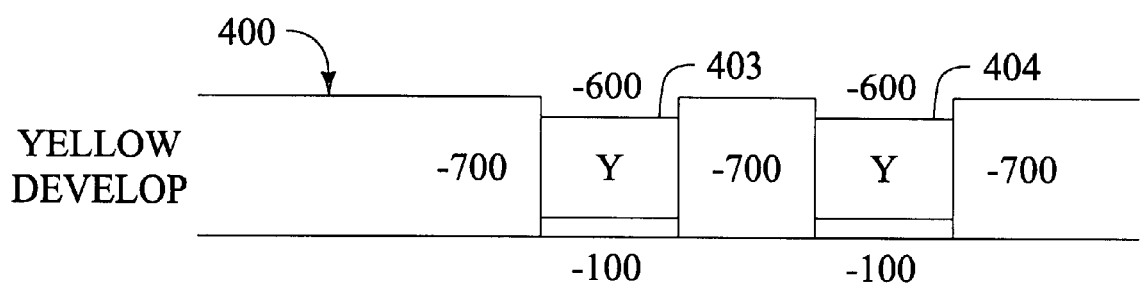
FIG. 6B is diagram showing the electrical bias of the photoconductor of FIG. 6A following development of the exposed pixels with yellow toner.
Figure 6C:
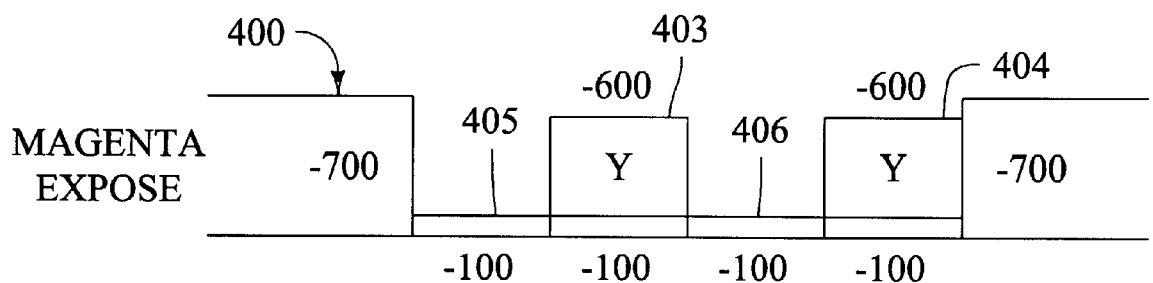
FIG. 6C is diagram showing the electrical bias of the photoconductor of FIG. 6B following exposure of other selected pixels.
Figure 6D:
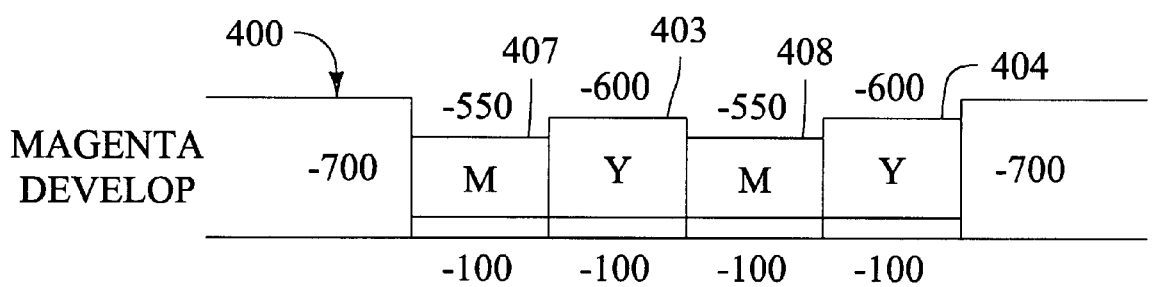
FIG. 6D is diagram showing the electrical bias of the photoconductor of FIG. 6C following development with magenta of the pixels exposed in FIG. 6C.

FIGS. 6A through 6D depict the bias on the photoconductive material in an exemplary electrophotographic process using the developer section 200 of the printer 50 of FIG. 5. In FIG. 6A the photoconductive material 400 is depicted in side view after it has been charged with a base potential of −700V and has been selectively exposed by the laser at exposure location 213. The laser has exposed the segments 401 and 402 (corresponding to pixels) to a bias of −100V. In FIG. 6B, the photoconductive material 400 is developed with yellow developer using the developer station 202 to deposit yellow toner 403 and 404 on the previously exposed segments. The yellow toner has a bias of −600V. The photoconductive material 400 is then moved past the second expose station 215 where the laser beam selectively exposes segments 405 and 406 of the photoconductive material to −100V, as depicted in FIG. 6C. Finally, in FIG. 6D the segments 405 and 406 which were exposed in FIG. 6C are developed with magenta toner 407 and 408. The magenta toner has an electrical bias of −550V, and is therefore unlikely to be deposited on the previously developed sections 403 and 404, which have a higher electrical potential than does the magenta toner. Similar expose-develop processes can then take place at exposure locations 217 and 219, and developer stations 206 and 208. By limiting the developer bias levels to only the attractive force necessary to attract the intended developer, the developer will not be inclined to move to previously developed levels having potentials higher than the potential of the developer. Although development to completion may not be fully achieved, the differences in bias levels serve to avoid unwanted contamination from subsequent developments.

A schematic diagram showing the electrical biases for one embodiment of four-color, cascade color printing described above is shown in FIG. 8A. FIG. 8A depicts the electrical bias of the photoconductor of "OPC" during various stages of the imaging process. The OPC is initially biased to about −700V at 501. The exposure assembly then selectively discharges the OPC to about −100V at 502. Toner is applied to the discharged regions to be developed in black at −550V at 503; regions to be developed in cyan are developed at −500V at 504; magenta is developed at −450V at 505, and finally yellow is developed at −400V at 506. In this way a 50V differential is provided between each developing stage. If for example black should only develop to 500V, there will be little or no attractive potential for subsequent toners (at −500V to −400V) to be attracted to the black region (at −500V).

A second embodiment of four-color, cascade color printing, discussed above, is shown in FIG. B. The primary difference between FIGS. 8A and 8B is that cyan is developed at −550V, the same developing bias as black, in FIG. 8B. In this manner a 75V potential can now be provided for between cyan and magenta, as well as between magenta and yellow, further decreasing the likelihood for magenta to develop over cyan or yellow to develop over magenta.

Although the voltages in the example are all negative voltages, there is no requirement that only negative voltages be used. When I say that the photoconductive material is electrically charged, I mean that an electrical potential has been imparted to the drum to repel toner particles. When I say that the photoconductive material is discharged by the laser (i.e., "exposed"), I mean that the charge has been changed to a value significantly different from the initial charge so that the discharged area will attract electrically charged toner particles. It is the relative differentials between the charges on the photoconductor drum and the charges on the toner particles which determine whether or not a toner particle will be attracted to the photoconductor drum.

Once the photoconductive material is moved past all four developer stations, the toner on the photoconductor drum 201 is transferred to the media on which the final image is to be printed. This is accomplished at transfer drum 214 which imparts an electrical bias of sufficient level to the media to attract essentially all of the toner from the photoconductor drum 201 to the media "I". The toner is then fused to the media using a fusing station (not shown), and the media is then passed along to a pick-up tray (not shown) where a user can retrieve the printed image. Any remaining toner on the photoconductor drum 201 is removed by cleaning station 212 prior to recharging the photoconductive material with base charger 210.

Figure 7:
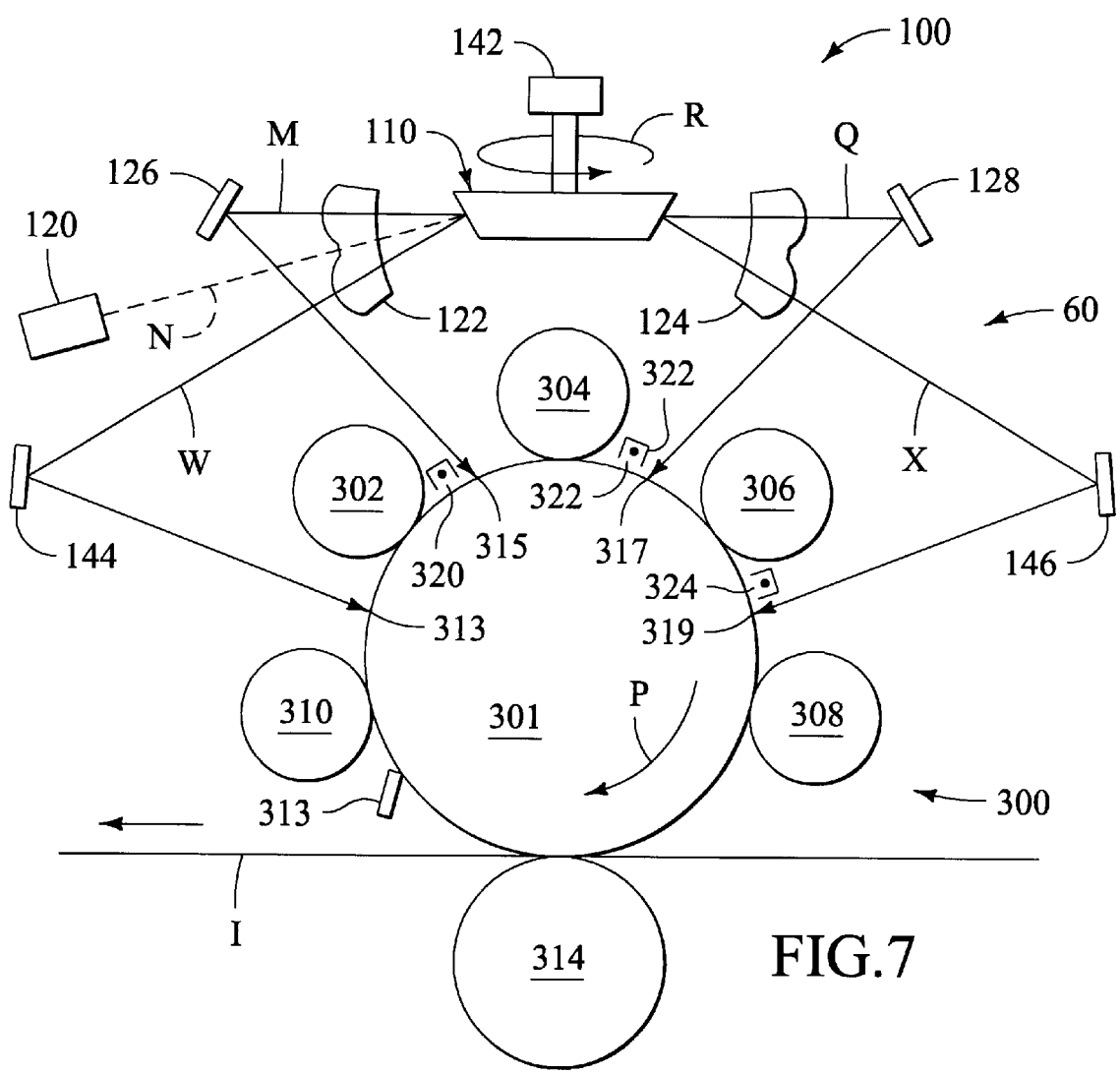
FIG. 7 is a side elevation schematic diagram of a second embodiment of the present invention using a photoconductor drum and individual developing stations with intermediate recharging.

A variation on the developer section 200 of FIG. 5 is shown in FIG. 7. FIG. 7 depicts a schematic diagram of an electrophotographic printer 60 which has a scanner section 100 and a developer section 300. The primary difference between the developer section 300 and the developer section 200 shown in FIG. 5 is the addition of intermediate charging stations 320, 322, and 324. The intermediate charging stations 320, 322, and 324 are positioned respectively after each developer station 302, 304 and 306, but before respective expose stations 315, 317 and 319. The intermediate charging stations can comprise corona discharge devices, and are configured to reestablish a base charge on the photoconductive material following development, but prior to subsequent exposure, of the photoconductive material. This includes reestablishing the base bias on already developed sections. Recharging the photoconductive material reduces post-development contamination, eliminates the need for multiple developer biases, and allows subsequent toner to be deposited on previously deposited toner. However, is also requires a substantial increase in size and complexity of the imaging apparatus. One alternative is to only provide recharging stations before selected toner developing stations, such as black and yellow, rather before all four developing stations.

Figure 13:
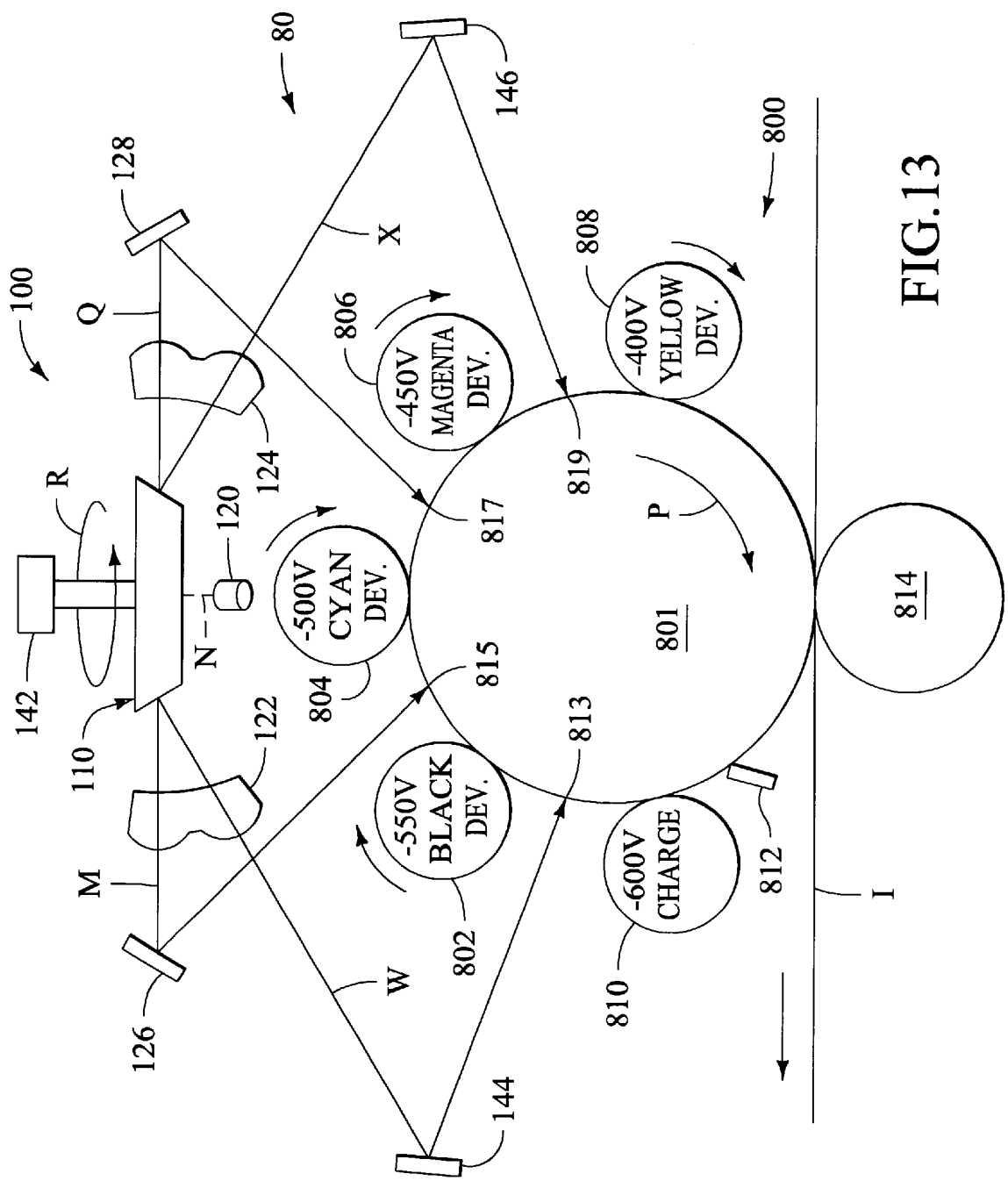
FIG. 13 is a side elevation schematic diagram an electrophotographic printer similar to that shown in FIG. 5 but with a different developing section.

Turning now to FIG. 13, an alternate embodiment of a developer station is shown. FIG. 13 depicts a side elevation schematic diagram of a printer 80 having a scanning section 100 and a developer section 800. The developer section 800 includes a photoconductor drum 801 which supports photoconductive material (not shown). The developer section 800 further includes developer stations 802, 804, 806 and 808, base charging station 810, and exposure locations or stations 813, 815, 817 and 819. The developer section also includes transfer drum 814 for transferring toner from the photoconductor drum 801 to the media "I" in the manner described above for developer section 200. The photoconductor drum 801 is configured to rotate in the process direction indicated by the arrow P to move the photoconductive material past the various developing and exposing stations.

As shown in FIG. 13, the order in which the toner is presented to the photoconductive material by the developer stations 802, 804, 806 and 808 is respectively black, cyan, magenta and yellow. This order is the reverse of the order of toner deposition for the developer section 200 shown in FIG.

5. One reason for the order of the toner deposition of the developer section 800 is that if any subsequent toner develops onto a previously developed area, the contamination of the previously deposited toner will not be as apparent. That is, lighter colored toners will have less visible effect when deposited on top of darker colored toners.

Other methods to improve the accuracy of the reproduction of the raster data image onto the photoconductor will now be discussed. In general, the objective is to more fully develop each pixel to completion with its intended color such that later toners in the process will not tend to deposit on or contaminate previously deposited toner.

The use of a single photoconductor drum, versus multiple photoconductor drums and a transfer belt, will improve the placement accuracy of the color application simply by removing the additional transfer step which can allow toner to shift from one pixel to another during the transfer process. Also, the use of four-beam scanning (whether from 4 separate laser diodes or two laser diodes configured for dual scanning, as described above) in conjunction with a single photoconductor drum allows all four colors to be transferred to the drum during a single rotation of the drum, eliminating repeated opportunities for toner to migrate during multiple revolutions of the drum which are required in a less-than four-beam scanning configuration. The scanning section 100 of FIGS. 5, 7 and 13 can all perform four beam scanning. By "four-beam scanning" it is understood that I am referring to scanning to four different developing stations essentially simultaneously, rather than scanning with two or more beams at a single developing station, as can be accomplished with two laser diodes mounted on a single microchip.

Toner is charged with a direct current (DC) charge to allow it to be attracted to the photoconductor, as described above. In addition to the DC bias, toner is typically provided with an alternating current (AC) component to agitate the toner particles to encourage their movement across the exposed segments. One method to help ensure that toner does not move onto the photoconductor when a color is not selected for use during printing of an image onto the photoconductor drum is to switch off the AC bias element. For example, if a page is to be printed with only black text, then the AC bias to the cyan, magenta and yellow developer substations can be switched off. The cyan, magenta and yellow toner will then have less electrical potential for moving onto the photoconductor. Preferably, some DC bias is maintained on the non-developing developer stations to reduce contamination of the developer toner hoppers. Alternately, the DC bias of the selected developer substations can be set to a higher value than the non-selected toners to ensure that toner from the non-selected stations does not move onto the photoconductor. For example, referring to the developer section 800 of FIG. 13, if cyan is normally DC biased to −500V, and magenta to −450V, and if cyan is a non-selected color, then the DC bias of magenta can be raised to −500V to increase the difference in potential between cyan and yellow (at −400V) to thus decrease the likelihood that yellow will move onto cyan that has not been developed to completion.

In addition to controlling the AC component of non-selected developing stations, the AC component of developing stations selected for printing can be controlled to reduce the inclination for previously applied toner to migrate into subsequent toner hoppers. The AC component is intended to facilitate movement of toner onto the photoconductor. Typically, the AC component is the same for each developing station. However, using different AC components for each developing station can help to reduce contamination of later toner hoppers with previously applied toner. For example, in a black-cyan-magenta-yellow order printing process as described above, the AC component of the yellow can be lower than that of the other three developing stations to reduce agitation of already applied color. In this example, the AC component must be selected so as to still accomplish acceptable yellow toner development, yet decrease migration of black, cyan and magenta toner into the yellow toner hopper.

Another method to reduce the effects of contamination of toner in toner hoppers is to reduce the volume of toner in the hopper. In this manner, the toner in the hopper can be consumed before the effect of any contamination of the yellow toner becomes unacceptably apparent on the resultant image.

Several other methods can be employed to provide more complete development to completion, which will reduce the tendency for later toner to move onto previously developed areas. One such method is to select a toner which has a relatively high electrical charge per unit mass of toner. Since developer stations are configured to move toner particles past the exposed portion of the photoconductor, toner with higher charge to mass ratios will require that fewer toner particles be moved past the exposed section to develop the exposed section to completion. Conversely, if the same number of particles of toner are moved past the exposed section of the photoconductor regardless of the toner selected, a toner with a higher charge to mass ratio will tend to electrically saturate the exposed areas more completely.

Additionally, toners with a smaller average particle size should be preferentially used over toners of the same color having larger average particle sizes. Smaller toner particle sizes typically carry greater electrical charge per unit mass of toner, and will therefore increase the electrical saturation of the exposed areas for the selected toner. This will increase the development to completion of the exposed areas with the toner, thus decreasing the potential for subsequent toners to be applied over previously developed areas. In particular, toners which can be applied earlier in the toner application process should have a smaller average particle size than do toners which can be applied later in the toner application process. As stated above, the earlier development processes have more opportunity for being contaminated with subsequent toner than do the latter toner development processes.

A related method for increasing development to completion of an exposed area with the intended toner is to increase the developer-to-photoconductor speed ratio. That is, each developer station typically comprises a developer roller which rotates in the same rotational direction as the photoconductor drum, resulting in the developer roller and the photoconductor moving in opposite directions to one another at the point of interface. For example, see developer 202 and photoconductor drum 201 of FIG. 5. By increasing the speed of the developer roller, more toner particles can be moved over the exposed portions of the photoconductor, and consequently the photoconductor is more likely to be developed to completion by the subject developer. Alternately, the speed of the photoconductor drum can be decreased to allow the developer roller more time to fully develop the exposed sections. This latter method is a less preferred method for increasing the developer-to-photoconductor speed ratio since it can tend to reduce the printing speed of the printer.

A further method for increasing the electrical saturation of an exposed region with a selected toner is to select a toner having a smaller range of size distribution between toner particles. Toner particles are essentially small particles having a diameter range from the smallest particles to the largest particles. A narrower range of particle size distribution will increase the electrical saturation of an exposed area over toner having a large range of size distribution. This will result in fuller development to completion (electrical saturation) of the exposed areas, and will thus decrease the potential for subsequent toner particles to be applied over already developed areas. In particular, toners which can be used subsequently in the toner application process should have a smaller range of size distribution than do toners which can be applied earlier in the toner application process.

Another method to reduce toner hopper contamination is that toners which can be used subsequently in the toner application process, like yellow in FIG. 13, should have a larger particle size than do toners which can be applied earlier in the toner application process, like black of FIG. 13. This will result in a higher charge to mass ratio on the toner particles such as black, so that the yellow toner will tend to develop into its discharged regions, while the previously applied black toner will tend to stay on the photoconductor.

As mentioned, toner particles are typically small particles which are electrically charged to then be applied to exposed areas on the photoconductor. Typically, toner particles are carried by a roller to a transfer point proximate the photoconductor surface by carrier particles, which do not move onto the photoconductor. The carrier particles tend to be much larger in diameter (up to twenty times the diameter is typical) than the toner particles. In order to allow the carrier particles to pass between the developer roller and the photoconductor drum, a gap is provided between the developer roller and the drum which is slightly larger than the diameter of the carrier particles. Since the attractive force between toner particles and the developer drum is a function of the distance between the toner particle and the drum, the greater this distance is, the less potential there is for a toner particle to migrate from the developer station to the developer drum. By decreasing this distance between the toner particles and the developer drum, the more likely toner particles will be to migrate to the developer drum and thus develop an exposed area to saturation. Accordingly, toners should be selected which have smaller relative carrier particle diameters to toner diameters, so that the distance between the developer roller and the photoconductor can be decreased. In particular, toners which can be applied earlier in the toner application process should have a smaller carrier-to-toner particle diameter ratio than do toners which can be applied later in the toner application process. However, in taking this approach a limit can be reached where the electrical field between the photoconductor and the developer station can no longer be maintained, and the field breaks down due to the proximity of the two. This can, however, be compensated for by using a thicker coating of photoconductive material on the photoconductor drum.

As stated above, it is essentially the electrical potential between the toner particle and the developer material on the developer drum which causes the charged toner to migrate from the developer station to the developer drum. Also, earlier I described a method for reducing the tendency for subsequent toner to migrate onto previously developed areas by establishing a cascade of electrical potentials between developer stations, such that subsequent toners would not have sufficient potential to be developed onto previously developed area of the photoconductor. A further method for decreasing the potential of subsequent toners to develop onto previously developed areas of the photoconductor is to increase the step size in electrical potentials between development stages. This can be accomplished by increasing the initial charge on the photoconductor, such that there is more range for separation of developer electrical potentials. For example, if the photoconductor is initially charged to −1000V versus−800V, in a four developer electrophotographic color printer this offers an additional range of 200V which can be distributed among the four development stages, or an additional 50V differential per development stage. A thicker layer of photoconductive material on the photoconductor can allow larger electrical charges to be imparted to the photoconductor without incurring field breakdown.

Another method to increase the overall potential between the photoconductor potential and the final toner potential is to increase the amount of discharge of the photoconductor material which is achieved by the exposing laser beams. This can be accomplished by increasing the energy of the laser diodes in the scanning section. For example, if a photoconductor is initially charged to −800V and is then discharged to −200V by an exposing laser beam, the overall potential which can be distributed among four developer stations is 600V, or 150V per developer station. However, if the photoconductor is discharged to −50V, then the overall potential which can be distributed among the four developer stations is 750V, or just over 187V per developer stage, providing an additional 37V differential per development stage. This method can also be combined with the method described in the above paragraph to increase the overall potential between the photoconductor potential and the final toner potential.

Yet another method for ensuring more complete development of exposed areas on the photoconductor by the intended toner is to discharge the photoconductor to an intermediate level during exposure, rather than to the full amount of discharge. This method can be used for the earlier developer stations that have an excessively large electrical field, such as black and cyan of FIG. 13. For example, consider a scanning section and a photoconductor section in an electrophotographic printer configured such that the photoconductor is normally discharged from −800V to −100V during exposure by the laser. Further, the developer section is configured such that the black developer station is the first developer station in the development process. By modulating the power of the scanning laser at the black expose station, the photoconductor is discharged to only −400V rather than −100V. Consequently, much less black toner is required to develop the exposed area to completion. That is, since the same amount of black toner will still be moved across the exposed area, there is a much higher probability that the area will be developed to completion than if the area had been discharged to −100V. Since much less dark toner is required to color saturate a pixel than are the lighter colors (e.g., yellow), it does not matter that less toner is applied to the photoconductor when this method is implemented, and excessive toner pile heights help to be avoided. This method also reduces toner consumption.

One method to ensure more complete development of exposed areas on the photoconductor with the black toner is to use a ferrous black toner, rather than a plastic based black toner. Black ferrous toner cartridges are normally configured with a magnet to assist deposition of the black toner onto the black-exposed areas of the medium. If more toner is applied to the exposed area, the more likely it is that the area will be developed to completion.

In one embodiment of an electrophotographic printer in accordance with the present invention, the developer section is configured such that the black develop station is the first develop station in the develop process. A base cartridge is configured to include a photoconductor drum, the base charging unit or charge roller, and the black developer station. The printer is further configured to receive developer cartridges corresponding to developer stations for cyan, magenta and yellow color toner. The printer is configured such that when the additional color cartridges are added, they will deposit color toner onto the photoconductor drum in the accordance with methods described herein. In this manner, an electrophotographic printer can be provided which prints only in black (i.e., a monochrome printer), but which can be upgraded to four color electrophotographic printing capability merely by the addition of the additional three color developer stations, which can be contained in a single cartridge.

One method for registering the various colors to be printed in an electrophotographic printer is to use light sensors such as a charge coupled device (CCD) array which can be placed in known positions to intercept the laser beams. Based on the detected position of the beam by the sensor, the sensor can provide information indicating the amount and direction of correction needed to correctly register the detected beam. The information can then be taken into account by the microprocessor for accurate positioning of the laser discharge. For example, the information can be used by a microprocessor to adjust the timing of the laser pulses, which has the effect of relocating the beam target as a result of the movement of the rotatable mirror and the photoconductor as a function of time. The microprocessor can also be configured to adjust optical components through electromechanical devices (e.g., motors to move mirrors) to adjust the registration of any given laser beam.

In a first embodiment, the CCDs are built into the printer in a non-printing area such as adjacent to the sides of the photoconductor. The printer is provided with a microprocessor which controls the scanning process, in addition to providing other functions. The sweep of the laser beams is configured to sweep beyond the edges of the photoconductor and be intercepted by the CCDs. The information from the CCDs is provided to the microprocessor, which is provided with a series of computer executable program steps configured to process the information from the CCDs. The microprocessor can then align the registration of the laser beams in one of the manners described above based on the information from the CCDs.

In a second embodiment, the CCDs are built into a pseudo-developer section which is configured to be received within the printer in the absence of the actual developer section. Developer sections typically comprise replaceable cartridges which are easily removed and replaced. Accordingly, a printer with a removable developer section can accommodate the pseudo-developer cartridge. The CCDs can then be positioned in the actual printing path of the photoconductor. The cartridge can further contain a computer program printed onto a microchip for processing data from the CCDs. The program can be accessed by the printer's microprocessor via a plug connection between the pseudo-cartridge and the printer. The microprocessor can then align the registration of the laser beams in one of the manners described above based on the information from the CCDs. In this manner the registration of the scanning lasers can be performed at a point of manufacture or in a repair facility using the pseudo-cartridge, and the printer can be manufactured without the CCDs.

In addition to the developer stations 200, 300 and 800 shown and described herein, it should be appreciated that a scanner section in accordance with the present invention can be used with other developer stations, including prior art developer stations. Likewise, although the developer sections 200 and 800 are shown and described as being used with scanner section 100, it is to be appreciated that the developer sections in accordance with the present invention can be used with other scanner sections, both those shown and described herein, as well as prior art scanning sections.

The Method

Another aspect of the present invention is a method of developing a color image onto a photoconductor. The first step of the method includes providing a photoconductor having a continuous surface on which is supported a photoconductive material. The continuous surface can be a rotatable drum. The method also includes providing a first toner and a second toner. A first electrical bias is applied to a portion of the photoconductive material to create an electrically charged region of the photoconductive material. This can be achieved with a base charging station. First selected positions in the charged region of the photoconductive material are then electrically discharged to a second electrical bias which is sufficient to attract the first toner. Typically, this discharging is performed with a laser scanning section, and corresponds to exposing pixels to be printed by the first toner. The first selected portions are then developed with the first toner at a third electrical bias. Second selected positions in the charged region of the photoconductive material are then electrically discharged to a fourth electrical bias which is sufficient to attract the second toner. The second selected portions are then developed with the second toner at a fifth electrical bias. The fifth electrical bias is closer to the fourth electrical bias than is the third electrical bias.

The method can further include providing a third toner and electrically discharging third selected positions in the charged region of the photoconductive material to the fourth electrical bias which is sufficient to attract the third toner. The third selected portions are then developed with the third toner at a sixth electrical bias. The sixth electrical bias is closer to the fourth electrical bias than is the fifth electrical bias. The method can also include the additional steps of providing a fourth third toner and electrically discharging fourth selected positions in the charged region of the photoconductive material to the fourth electrical bias which is sufficient to attract the fourth toner. The fourth selected portions are then developed with the fourth toner at a seventh electrical bias. The seventh electrical bias is closer to the fourth electrical bias than is the sixth electrical bias.

In this manner, four colors can be printed onto a photoconductor by providing a single base charge to the photoconductor. Further, the toners applied to the photoconductor will have little tendency to contaminate one another due to the cascading of the various toner potentials such that earlier applied toners are at higher electrical potentials than are later applied toners, and consequently the later applied toners will not tend to migrate to the previously developed sections.

While the above invention has been described with particularity to specific embodiments and examples thereof, it is understood that the invention comprises the general novel concepts disclosed by the disclosure provided herein, as well as those specific embodiments and examples shown and described herein.

I claim:

1. An electrophotographic color printer, comprising:
   a scanning section configured to generate a plurality of selectively pulsed beams of energy to selectively discharge portions of an electrically charged photoconductive material to a first electrical potential; and
   a developer section comprising:
   a continuous rotatable surface;

photoconductive material supported on the continuous surface;

a base charging station positioned proximate to the photoconductive material and configured to impart a predetermined second electrical potential to the photoconductive material as the photoconductive material is moved past the base charging station by the rotatable surface and prior to the photoconductive material being discharged by the pulsed beams of laser energy from the scanning section:

a first developing station configured to apply a first toner at a third electrical potential to portions of the photoconductive material discharged by a first beam of laser energy from the scanning section;

a second developing station configured to apply a second toner at a fourth electrical potential to portions of the photoconductive material discharged by a second beam of laser energy from the scanning section and subsequent to the first toner;

a third developing station configured to apply a third toner at a fifth electrical potential to portions of the photoconductive material discharged by a third beam of laser energy from the scanning section and subsequent to the second toner;

a fourth developing station configured to apply a fourth toner at a sixth electrical potential to portions of the photoconductive material discharged by a fourth beam of laser energy from the scanning section and subsequent to the third toner; and wherein the ascending order of absolute values of the electrical potentials are the first, the fourth, the third, and the second electrical potential, and the absolute value of the fifth electrical potential is between the absolute values of the first and the fourth electrical potentials, and the absolute value of the sixth electrical potential is between the absolute values of the first and the fifth electrical potentials; and wherein developing stations are configured with respect to the continuous rotatable surface such that during operation the order of application of the toners to the continuous rotatable surface are the first, the second, the third and the fourth toners.

2. An electrophotographic color printer, comprising:

a scanning section configured to generate a plurality of selectively pulsed beams of energy to selectively discharge portions of an electrically charged photoconductive material to a first electrical potential; and a developer section comprising:

a continuous rotatable surface;

photoconductive material supported on the continuous surface;

a base charging station positioned proximate to the photoconductive material and configured to impart a predetermined second electrical potential to the photoconductive material as the photoconductive material is moved past the base charging station by the rotatable surface and prior to the photoconductive material being discharged by the pulsed beams of laser energy from the scanning section;

a first developing station configured to apply a first toner at a third electrical potential to portions of the photoconductive material discharged by a first beam of laser energy from the scanning section; and a second developing station configured to apply a second toner at a fourth electrical potential to portions of the photoconductive material discharged by a second beam of laser energy from the scanning section and subsequent to the first toner; and wherein the ascending order of absolute values of the electrical potentials are the first, the fourth, the third, and the second electrical potential; and wherein the scanning section is further configured to generate a plurality of selectively pulsed beams of laser energy to selectively discharge portions of the photoconductive material to a fifth electrical potential, and wherein the absolute value of the fifth electrical potential is between the absolute values of the first and the third electrical potentials.

3. An electrophotographic color printer, comprising:

a photoconductor section comprising photoconductive material configured to be exposed to receive a plurality of color toners in a selective manner representative of a color image to be printed; and a scanning section comprising:

a laser configured to generate pulsed beams of laser energy to be directed to the photoconductor section to selectively expose the photoconductive material; and a rotatable, polygonal-sided mirror having a plurality of reflective facets corresponding to selected sides of the polygon, and wherein;

at least a first one of the reflective facets is oriented at a first angle with respect to a vertical axis of rotation of the polygonal-sided mirror to cause a beam of laser energy from the laser to be reflected to a first predetermined relative lineal position on the photoconductive material;

at least a second one of the reflective facets is oriented at a second angle with respect to the vertical axis of rotation of the polygonal-sided mirror to cause a beam of laser energy from the laser to be reflected to a second predetermined relative lineal position on the photoconductive material; and the laser is positioned with respect to the rotatable polygon-sided mirror and the photoconductor section such that a beam of laser energy from the laser is in optical contact with one of the reflective facets throughout a predetermined angel of rotation of the rotatable polygon-sided mirror, and that during the first half of the rotation through the predetermined angle of rotation, the beam of laser energy is reflected by the reflective facet to the first predetermined relative lineal position on the photoconductive material, and during the second half of the rotation through the predetermined angle of rotation, the beam of laser energy is reflected by the reflective facet to a second predetermined relative lineal position on the photoconductive material.

4. An electrophotographic color printer, comprising:

a photoconductor section comprising photoconductive material configured to be exposed to receive a plurality of color toners in a selective manner representative of a color image to be printed; and a scanning section comprising:

a laser configured to generate pulsed beams of laser energy to be directed to the photoconductor section to selectively expose the photoconductive material; and a rotatable, polygonal-sided mirror having a plurality of reflective facets corresponding to selected sides of the polygon, wherein:

at least a first one of the reflective facets is oriented at a first angle with respect to a vertical axis of rotation of the polygonal-sided mirror to cause a beam of laser energy from the laser to be reflected to a first predetermined relative lineal position on the photoconductive material;

at least a second one of the reflective facets is oriented at a second angle with respect to the vertical axis of rotation of the polygonal-sided mirror to cause a beam of laser energy from the laser to be reflected to a second predetermined relative lineal position on the photoconductive material; and further comprising a second laser configured to generate second pulsed beams of laser energy to be directed to the photoconductor section to selectively expose the photoconductive material, and wherein:

the at least first one of the reflective facets causes a beam of laser energy from the second laser to be reflected to a third predetermined relative lineal position on the photoconductive material; and the at least second one of the reflective facets cause a beam of laser energy from the second laser to be reflected to a fourth predetermined relative lineal position on the photoconductive material.

5. An electrophotographic color printer, comprising:

a photoconductor section comprising photoconductive material configured to be exposed to receive a plurality of color toners in a selective manner representative of a color image to be printed; and a scanning section comprising:
  a laser configured to generate pulsed beams of laser energy to be directed to the photoconductor section to selectively expose the photoconductive material; and a rotatable, polygonal-sided mirror having a plurality of reflective facets corresponding to selected sides of the polygon, wherein:
  at least a first one of the reflective facets is oriented at a first angle with respect to a vertical axis of rotation of the polygonal-sided mirror to cause a beam of laser energy from the laser to be reflected to a first predetermined relative lineal position on the photoconductive material; and
  at least a second one of the reflective facets is oriented at a second angle with respect to the vertical axis of rotation of the polygonal-sided mirror to cause a beam of laser energy from the laser to be reflected to a second predetermined relative lineal position on the photoconductive material; and wherein;
  the laser is characterized by a pulse frequency of the laser beam it produces, the printer further comprising a pulse frequency modulation circuit configured to selectively change the frequency of the laser according to whether the beam is being reflected by a reflective facet having the first angle with respect to a vertical axis of rotation of the polygonal-sided mirror, or a reflective facet having the second angle with respect to the vertical axis of rotation of the polygonal-sided mirror.

6. An electrophotographic color printer, comprising:

a photoconductor section comprising photoconductive material configured to be exposed to receive a plurality of color toners in a selective manner representative of a color image to be printed; and scanning section comprising:
  a laser configured to generate pulsed beams of laser energy to be directed to the photoconductor section to selectively expose the photoconductive material; and a rotatable, polygonal-sided mirror having a plurality of reflective facets corresponding to selected sides of the polygon, wherein:
  at least a first one of the reflective facets is oriented at a first angle with respect to a vertical axis of rotation of the polygonal-sided mirror to cause a beam of laser energy from the laser to be reflected to a first predetermined relative lineal position on the photoconductive material; and
  at least a second one of the reflective facets is oriented at a second angle with respect to the vertical axis of rotation of the polygonal-sided mirror to cause a beam of laser energy from the laser to be reflected to a second predetermined relative lineal position on the photoconductive material;
  the distance from the at least first one of the reflective facets to the first predetermined relative lineal position on the photoconductive material defines a first optical path length, and the distance from the at least second one of the reflective facets to the second predetermined relative lineal position on the photoconductive material defines a first optical path length;
  the first optical path length is longer than the second optical path length;
  the at least first one of the reflective facets is defined by a first side length, and the at least second one of the reflective facets is defined by a second side length; and
  the first side length is shorter than the second side length.

7. The electrophotographic printer of claim 6 wherein a laser beam to be reflected by the at least first reflective facet is modulated to a first pulse frequency, and a laser beam to be reflected by the at least second reflective facet is modulated to a second pulse frequency, and wherein the first pulse frequency is higher than the second pulse frequency.

8. An electrophotographic color printer, comprising:

a scanning section configured to generate a plurality of selectively pulsed beams of energy to selectively discharge portions of an electrically charged photoconductive material to a first electrical potential; and a developer section comprising:
  a continuous rotatable surface;
  photoconductive material supported on the continuous surface;
  a base charging station positioned proximate to the photoconductive material and configured to impart a predetermined second electrical potential to the photoconductive material as the photoconductive material is moved past the base charging station by the rotatable surface and prior to the photoconductive material being discharged by the pulsed beams of laser energy from the scanning section;
  a first developing station configured to apply a first toner at a third electrical potential to portions of the photoconductive material discharged by a first beam of laser energy from the scanning section; and p2 a second developing station configured to apply a second toner at a fourth electrical potential to portions of the photoconductive material discharged by a second beam of laser energy from the scanning section and subsequent to the first toner; and wherein the ascending order of absolute values of the electrical potentials are the first, the fourth, the third, and the second electrical potential; and further comprising a beam calibration apparatus for focusing the pulsed beams of laser energy at the first and second developing stations, comprising a first charge coupled device array positioned proximate the continuous rotatable surface at the first developing station, a second charge coupled device array positioned proximate the continuous rotatable surface at the first developing station, a microprocessor in signal communication with the first and second charge coupled device arrays, wherein each charge coupled device array is positioned to intercept the pulsed beam of laser energy and to generate a signal relative to the points of impact of the pulsed beams of laser energy on the charge coupled device arrays, and wherein the microprocessor is configured to receive the signals generated by the charge coupled device arrays and generate calibration information relative to the difference between the actual points of impacts of the pulsed beams of laser energy on the charge coupled device arrays and intended points of impact of the pulsed beams of laser energy on the charge coupled device arrays.

9. A method of developing a color image onto a photoconductor, comprising:

providing a photoconductor having a continuous surface on which is supported a photoconductive material;

providing a first toner and a second toner;

applying a first electrical bias to a portion of the photoconductive material to create an electrically charged region of the photoconductive material;

electrically discharging first selected positions in the charged region of the photoconductive material to a second electrical bias which is sufficient to attract the first toner;

developing the first selected portions with the first toner at a third electrical bias;

electrically discharging second selected positions in the charged region of the photoconductive material to a fourth electrical bias which is sufficient to attract the second toner;

developing the second selected portions with the second toner at a fifth electrical bias, the fifth electrical bias being closer to the fourth electrical bias than is the third electrical bias; and the fourth electrical bias is greater than or equal to the second electrical bias; and wherein the second electrical bias is greater than the fourth electrical bias, and less than the fifth electrical bias.

10. A method of developing a color image onto a photoconductor, comprising:

providing a photoconductor having a continuous surface on which is supported a photoconductive material;

providing a first toner, a second toner, a third toner and a fourth toner;

applying a first electrical bias to a portion of the photoconductive material to create an electrically charged region of the photoconductive material;

electrically discharging first selected positions in the charged region of the photoconductive material to a second electrical bias which is sufficient to attract the first toner;

developing the first selected portions with the first toner at a third electrical bias;

electrically discharging second selected positions in the charged region of the photoconductive material to a fourth electrical bias which is sufficient to attract the second toner;

developing the second selected portions with the second toner at a fifth electrical bias, the fifth electrical bias being closer to the fourth electrical bias than is the third electrical bias;

electrically discharging third selected positions in the charged region of the photoconductive material to the fourth electrical bias which is sufficient to attract the third toner;

developing the third selected portions with the third toner at a sixth electrical bias, the sixth electrical bias being closer to the fourth electrical bias than is the fifth electrical bias;

electrically discharging fourth selected positions in the charged region of the photoconductive material to the fourth electrical bias which is sufficient to attract the fourth toner; and developing the fourth selected portions with the fourth toner at a seventh electrical bias, the seventh electrical bias being closer to the fourth electrical bias than is the sixth electrical bias; and wherein the fourth electrical bias is greater than or equal to the second electrical bias; and wherein the third and fourth toners are magenta and yellow toners, and wherein the third electrical bias is insufficient to attract the third and fourth toners.

11. A method of developing a color image onto a photoconductor, comprising:

providing a photoconductor having a continuous surface on which is supported a photoconductive material;

providing a first toner and a second toner;

applying a first electrical bias to a portion of the photoconductive material to create an electrically charged region of the photoconductive material;

electrically discharging first selected positions in the charged region of the photoconductive material to a second electrical bias which is sufficient to attract the first toner;

developing the first selected portions with the first toner at a third electrical bias;

electrically discharging second selected positions in the charged region of the photoconductive material to a fourth electrical bias which is sufficient to attract the second toner;

developing the second selected portions with the second toner at a fifth electrical bias, the fifth electrical bias being closer to the fourth electrical bias than is the third electrical bias; and the fourth electrical bias is greater than or equal to the second electrical bias; and wherein a third toner is provided and is configured to develop on selected electrically discharged portions of the photoconductive material at a sixth electrical bias, and wherein the third toner is not selected for developing during the process of developing a color image onto the photoconductor, and wherein the sixth electrical bias comprises an alternating current portion and a direct current portion during development of the third toner, the additional step of decreasing the alternating current portion of the sixth electrical bias.

* * * * *